(12) United States Patent
Jacobsen et al.

(10) Patent No.: US 9,369,760 B2
(45) Date of Patent: Jun. 14, 2016

(54) WIRELESS HANDS-FREE COMPUTING HEAD MOUNTED VIDEO EYEWEAR FOR LOCAL/REMOTE DIAGNOSIS AND REPAIR

(71) Applicant: Kopin Corporation, Tauton, MA (US)

(72) Inventors: Jeffrey J. Jacobsen, Hollister, CA (US); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 66 days.

(21) Appl. No.: 13/719,146

(22) Filed: Dec. 18, 2012

(65) Prior Publication Data

US 2013/0174205 A1 Jul. 4, 2013

Related U.S. Application Data

(60) Provisional application No. 61/581,464, filed on Dec. 29, 2011.

(51) Int. Cl.
*G02B 27/01* (2006.01)
*H04N 21/4363* (2011.01)
(Continued)

(52) U.S. Cl.
CPC ........ *H04N 21/43637* (2013.01); *G02B 27/017* (2013.01); *G06F 1/163* (2013.01); *G06F 3/011* (2013.01); *G06F 3/012* (2013.01); *G06F 3/017* (2013.01); *G02B 2027/014* (2013.01); *G02B 2027/0138* (2013.01)

(58) Field of Classification Search
CPC ............................................... H04N 21/43637
USPC ......................................................... 455/566
See application file for complete search history.

(56) References Cited

U.S. PATENT DOCUMENTS

| | | |
|---|---|---|
| 5,005,213 A | 4/1991 | Hanson et al. |
| 5,594,469 A | 1/1997 | Freeman et al. |

(Continued)

FOREIGN PATENT DOCUMENTS

| | | |
|---|---|---|
| CN | 1797299 A | 7/2006 |
| CN | 101196793 A | 6/2008 |

(Continued)

OTHER PUBLICATIONS

Notification Concerning Transmittal of International Preliminary Report on Patentability and International Preliminary Report on Patentability, PCT/US2012/068686, "Wireless Hands-Free Computing Head Mounted Video Eyewear For Local/Remote Diagnosis And Repair", date of mailing Jul. 10, 2014.

(Continued)

*Primary Examiner* — David Bilodeau
(74) *Attorney, Agent, or Firm* — Hamilton, Brook, Smith and Reynolds, P.C.

(57) ABSTRACT

The present application relates to human/computer interfaces and more particularly to a wireless computing headset with one or more microdisplay devices that can provide hands-free remote control of attached or remote peripheral devices, systems and/or networks. A wireless hands-free video computing headset, and corresponding method, enabling communication with a host processor to provide the user omnipresent expertise is disclosed. The wireless hands-free video computing headset, which includes a microdisplay device to present information to the user graphically, communicates with a host processor to provide the user with an expert resource. The expert resource may take numerous forms, such as diagnostic software, or live human support. The wireless hands-free video computing headset is useful by enabling the user to focus his or her attention, and maintain his or her focus, on a physical subject by enabling hands-free control, enabling the user the ability to continuously manipulate the subject manually with his or her hands as needed.

14 Claims, 15 Drawing Sheets

(51) Int. Cl.
  *G06F 1/16* (2006.01)
  *G06F 3/01* (2006.01)

(56) References Cited

U.S. PATENT DOCUMENTS

| | | |
|---|---|---|
| 6,084,556 A | 7/2000 | Zwern |
| 6,198,462 B1 | 3/2001 | Daily et al. |
| 6,313,864 B1 | 11/2001 | Tabata et al. |
| 6,369,952 B1 | 4/2002 | Rallison et al. |
| 6,538,676 B1 | 3/2003 | Peters et al. |
| 6,778,906 B1 | 8/2004 | Hennings et al. |
| 7,501,995 B2 | 3/2009 | Morita et al. |
| 7,620,433 B2 | 11/2009 | Bodley |
| 8,108,143 B1 | 1/2012 | Tester |
| 8,170,262 B1 | 5/2012 | Liu |
| 8,184,983 B1 | 5/2012 | Ho et al. |
| 8,327,295 B2 | 12/2012 | Ikeda |
| 8,577,427 B2 | 11/2013 | Serota |
| 8,855,719 B2 | 10/2014 | Jacobsen et al. |
| 8,862,186 B2 | 10/2014 | Jacobsen et al. |
| 8,929,954 B2 | 1/2015 | Jacobsen et al. |
| 9,122,307 B2 | 9/2015 | Jacobsen et al. |
| 9,235,262 B2 | 1/2016 | Jacobsen et al. |
| 2001/0003712 A1 | 6/2001 | Roelofs |
| 2002/0030649 A1 | 3/2002 | Zavracky et al. |
| 2002/0044152 A1 | 4/2002 | Abbott, III et al. |
| 2002/0065115 A1 | 5/2002 | Lindholm |
| 2002/0154070 A1 | 10/2002 | Sato et al. |
| 2003/0065805 A1 | 4/2003 | Barnes, Jr. |
| 2003/0067536 A1 | 4/2003 | Boulanger et al. |
| 2004/0113867 A1 | 6/2004 | Tomine et al. |
| 2004/0193413 A1 | 9/2004 | Wilson et al. |
| 2004/0210852 A1 | 10/2004 | Balakrishnan et al. |
| 2004/0267527 A1 | 12/2004 | Creamer et al. |
| 2005/0114140 A1 | 5/2005 | Brackett et al. |
| 2005/0237296 A1 | 10/2005 | Lee |
| 2005/0245292 A1 | 11/2005 | Bennett et al. |
| 2006/0028400 A1 | 2/2006 | Lapstun et al. |
| 2006/0061551 A1 | 3/2006 | Fateh |
| 2006/0109237 A1 | 5/2006 | Morita et al. |
| 2006/0166705 A1 | 7/2006 | Seshadri et al. |
| 2006/0178085 A1 | 8/2006 | Sotereanos et al. |
| 2006/0221266 A1 | 10/2006 | Kato et al. |
| 2007/0009125 A1 | 1/2007 | Frerking et al. |
| 2007/0030174 A1 | 2/2007 | Randazzo et al. |
| 2007/0053544 A1 | 3/2007 | Jhao et al. |
| 2007/0093279 A1 | 4/2007 | Janik |
| 2007/0103388 A1 | 5/2007 | Spitzer |
| 2007/0180979 A1 | 8/2007 | Rosenberg |
| 2007/0220108 A1 | 9/2007 | Whitaker |
| 2007/0238475 A1 | 10/2007 | Goedken |
| 2007/0265495 A1 | 11/2007 | Vayser |
| 2008/0052643 A1 | 2/2008 | Ike et al. |
| 2008/0055194 A1 | 3/2008 | Baudino et al. |
| 2008/0084992 A1 | 4/2008 | Peddireddy et al. |
| 2008/0120141 A1 | 5/2008 | Kariathungal et al. |
| 2008/0144854 A1 | 6/2008 | Abreu |
| 2008/0180640 A1 | 7/2008 | Ito |
| 2008/0200774 A1 | 8/2008 | Luo |
| 2008/0239080 A1 | 10/2008 | Moscato |
| 2009/0002640 A1 | 1/2009 | Yang et al. |
| 2009/0079839 A1 | 3/2009 | Fischer et al. |
| 2009/0093304 A1 | 4/2009 | Ohta |
| 2009/0099836 A1 | 4/2009 | Jacobsen et al. |
| 2009/0117890 A1 | 5/2009 | Jacobsen et al. |
| 2009/0182562 A1 | 7/2009 | Caire et al. |
| 2009/0204410 A1 | 8/2009 | Mozer et al. |
| 2009/0213071 A1 | 8/2009 | Wang et al. |
| 2009/0251409 A1 | 10/2009 | Parkinson et al. |
| 2010/0117930 A1 | 5/2010 | Bacabara et al. |
| 2010/0128626 A1 | 5/2010 | Anderson et al. |
| 2010/0141554 A1 | 6/2010 | Devereaux et al. |
| 2010/0156812 A1 | 6/2010 | Stallings et al. |
| 2010/0164990 A1 | 7/2010 | Van Doorn |
| 2010/0182137 A1 | 7/2010 | Pryor |
| 2010/0245585 A1 | 9/2010 | Fisher et al. |
| 2010/0250231 A1 | 9/2010 | Almagro |
| 2010/0302137 A1 | 12/2010 | Benko et al. |
| 2010/0306711 A1 | 12/2010 | Kahn et al. |
| 2010/0309295 A1 | 12/2010 | Chow |
| 2011/0001699 A1 | 1/2011 | Jacobsen et al. |
| 2011/0092825 A1 | 4/2011 | Gopinathan et al. |
| 2011/0134910 A1 | 6/2011 | Chao-Suren et al. |
| 2011/0187640 A1 | 8/2011 | Jacobsen et al. |
| 2012/0068914 A1 | 3/2012 | Jacobsen et al. |
| 2012/0075177 A1 | 3/2012 | Jacobsen et al. |
| 2012/0089392 A1 | 4/2012 | Larco et al. |
| 2012/0110456 A1 | 5/2012 | Larco et al. |
| 2012/0166203 A1 | 6/2012 | Fuchs et al. |
| 2012/0236025 A1 | 9/2012 | Jacobsen et al. |
| 2012/0287284 A1 | 11/2012 | Jacobsen et al. |
| 2012/0302288 A1 | 11/2012 | Born et al. |
| 2013/0070930 A1 | 3/2013 | Johnson |
| 2013/0174205 A1 | 7/2013 | Jacobsen et al. |
| 2013/0231937 A1 | 9/2013 | Woodall et al. |
| 2013/0288753 A1 | 10/2013 | Jacobsen et al. |
| 2013/0289971 A1 | 10/2013 | Parkinson |
| 2013/0300649 A1 | 11/2013 | Parkinson et al. |
| 2014/0003616 A1 | 1/2014 | Johnson et al. |
| 2014/0059263 A1 | 2/2014 | Rosenberg et al. |
| 2014/0093103 A1 | 4/2014 | Breece et al. |
| 2014/0223299 A1 | 8/2014 | Han |
| 2014/0235169 A1 | 8/2014 | Parkinson et al. |
| 2014/0368412 A1 | 12/2014 | Jacobsen et al. |
| 2015/0039311 A1 | 2/2015 | Clark et al. |
| 2015/0072672 A1 | 3/2015 | Jacobsen et al. |

FOREIGN PATENT DOCUMENTS

| | | |
|---|---|---|
| CN | 101349944 A | 1/2009 |
| CN | 101581969 A | 11/2009 |
| CN | 101599267 A | 12/2009 |
| CN | 101620511 A | 1/2010 |
| JP | 2001-100878 A | 4/2001 |
| JP | 2001-506389 A | 5/2001 |
| JP | 2001-216069 A | 8/2001 |
| JP | 2002-525769 A | 8/2002 |
| JP | 2008-052590 A | 3/2008 |
| JP | 2009-179062 A | 8/2009 |
| WO | WO 99/01838 | 1/1999 |
| WO | WO 00/17848 | 3/2000 |
| WO | WO 2009/120984 A1 | 10/2009 |
| WO | WO 2011/097226 A1 | 8/2011 |
| WO | WO 2011/114149 A1 | 9/2011 |
| WO | WO 2013/101438 A1 | 7/2013 |

OTHER PUBLICATIONS

Notification of Transmittal of International Search Report and Written Opinion of PCT/US2012/068686, Date of Mailing: Mar. 25, 2013, 11 pages.
European Search Report for EP 12782481.1 dated Sep. 29, 2014.
International Preliminary Report on Patentability and Written Opinion, PCT/US2011/023337, mailing date, "Wireless Hands-Free Computing Headset with Detachable Accessories Controllable by Motion, Body Gesture and/or Vocal Commands", Aug. 16, 2012, 8 pages.
International Search Report and Written Opinion for PCT/US2013/065927 dated Mar. 21, 2014, entitled "Improved Headset Computer Operation Using Vehicle Sensor Feedback for Remote Control Vehicle".
Morphew, M.E., et al., "Helmet Mounted Displays for Unmanned Aerial Vehicle Control", Proceedings of SPIE, vol. 5442, Oct. 20, 2004.
Notification Concerning Transmittal of International Preliminary Report on Patentability of PCT/US2012/037284, "Headset Computer That Uses Motion and Voices to Control Information Display and Remote Devices", Date of Mailing: Nov. 12, 2013, 7 pages.
Notification of Transmittal of International Search Report and Written Opinion of PCT/US2012/037284, "Wireless Hands-Free Computing Head Mounted Video Eyewear for Local/Remote Diagnosis and Repair", dated Oct. 1, 2012.

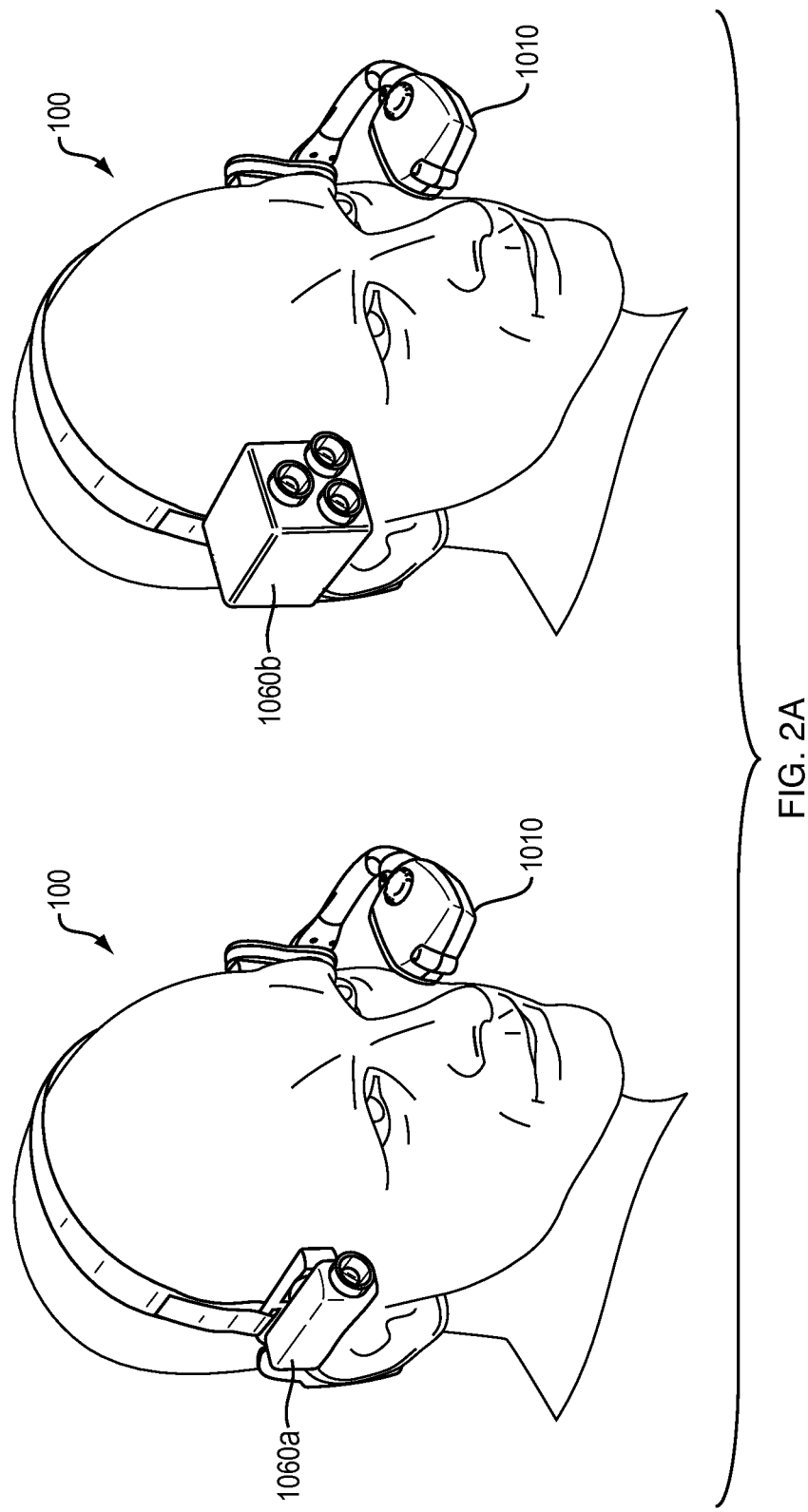

WIRELESS HANDS-FREE COMPUTING HEAD MOUNTED VIDEO EYEWEAR FOR LOCAL/REMOTE DIAGNOSIS AND REPAIR

RELATED APPLICATION

This application claims the benefit of U.S. Provisional Application No. 61/581,464, filed on Dec. 29, 2011.

The entire teachings of the above application(s) are incorporated herein by reference.

TECHNICAL FIELD

The present disclosure relates to the use of a wireless hands-free computing head-mounted display (HMD) or headset computer (HC) for enabling local or remote diagnosis and repair.

BACKGROUND OF THE DISCLOSURE

Small, portable electronic devices capable of storing and displaying large amounts of high resolution computer graphic information and even video content continue to be increasingly popular. Smart phone devices, such as the Apple iPhone™ and Google Android™, are representative of a significant trend towards the convergence of mobile phones, portable computers, and digital media players. (iPhone is a trademark of Apple Computer, Inc. of Cupertino, Calif.; Android is a trademark of Google, Inc. of Mountain View, Calif.) While these devices typically include a display screen, the visual experience of a high resolution, large format display cannot be easily replicated in such devices because of their physical size limitations.

In addition, a number of applications benefit from the use of untethered, portable video display devices. For example, certain applications for use by industrial workers, soldiers, police or emergency workers in the field require as an objective the ability to display video, untethered from a host platform, at a remote distance. This allows an industrial worker, soldier, police or emergency worker in the field to have access to all of the host platform's display information at a range equal to his or her wireless voice communications.

Recently developed micro-displays can provide large format, high resolution color pictures and streaming video in a very small form factor. One application for such displays is a head mounted display (HMD) worn on the user's face or head similar to a pair of eyeglasses or headphones. These "video eyewear" devices include a small high resolution micro-display and lens to magnify the image. The micro-displays can provide Super Video Graphics Array (SVGA) (800×600) resolution or even Extended Graphics Array (XGA) (1024× 768) or higher resolution. A hands-free wireless video interface provides great convenience and mobility to such devices. For more information concerning such devices, see U.S. patent application Ser. No. 13/018,999 filed on Feb. 1, 2011, entitled "Wireless Hands-Free Computing Headset With Detachable Accessories Controllable By Motion, Body Gesture And/Or Vocal Commands". The entire teachings of the above application are incorporated herein by reference.

SUMMARY OF THE DISCLOSURE

A wireless hands-free video computing headset (or headset computer (HC) or head mounted display (HMD)) enabling communication with a host processor to provide the user omnipresent expertise is disclosed. The wireless hands-free video computing headset can include one or more microdisplay devices to present information to the user graphically. The microdisplay may be embodied in various forms, such as a monocular display in a headset, a binocular display in an eyewear device, or in other hands-free configurations.

The omnipresent expertise can be remotely located or locally located and can consist of a real person or expert computer software (e.g., a software module). The wireless hands-free video computing headset communicates with a host processor to provide the user with an expert resource. The expert resource may take numerous forms, such as a diagnostic software module, or live human support. When equipped with a video camera, the wireless hands-free video computing HMD can provide a remote expert with a live video feed enabling the expert to see a situation in real time and give real time feedback to the user.

The wireless hands-free video computing headset further includes one or more peripheral ports and a local processor for supporting one or more peripheral devices that provide one or more input signals indicating a sensor input or at least a user motion and/or vocal input. The local processor, located in the portable wireless video computing headset device, further includes one or more receivers, for receiving the peripheral inputs; a translator, for translating sensor information, user motion and/or vocal input into one or more user commands; a display controller, for forwarding information to be displayed on the one or more microdisplays; and a communications interface, for wirelessly communicating with a remote host processor, the remote host processor enabled to access expert diagnosis and/or repair information.

The wireless hands-free video computing headset allows for hands-free operation by the user. The user does not need to interface with a computer in a traditional hands-dependent manner, such as using a keyboard, mouse, or touch gestures, to access expert information. The user of the wireless hands-free video computing headset always has easy access to the useful information; the user can quickly glance at the microdisplay and/or listen to voice prompts from the expert, which can be relayed over a speaker embedded in the headset.

The wireless hands-free video computing headset has many advantages over traditional and newer computer user interface technologies, such as mouse, keyboard, or touch screen user interfaces. The wireless hands-free video computing headset allows the user to focus his or her attention, and maintain his or her focus, on a subject of interest by enabling hands-free control, enabling the user the ability to continuously manipulate the subject with his or her hands as needed, and enabling a simple glance at the microdisplay to receive information visually, rather than requiring a user to look away from, or put down, what he or she is working on in order to interface with a computer. Further, such a device can be used for interactive training, such as, training safety personnel in a nuclear plant, or training golf players how to swing.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2A is a perspective view showing an embodiment HC system of the present invention as worn on the user's head with a camera peripheral device and multiple cameras peripheral device installed.

DETAILED DESCRIPTION OF AN EMBODIMENT

The present invention relates to human/computer interfaces and more particularly to a wireless computing headset with one or more microdisplay devices that can provide hands-free remote control of attached or remote peripheral devices, systems and/or networks. The wireless computing headset (HC or HMD), as well as attached or remote peripheral devices, systems and/or networks is enabled to receive one or multiple inputs such as hand motion, head motion, user gesture and/or vocal commands, 3 axis to 9 axis degrees of freedom orientational sensing, geo-positional, atmospheric sensors, health condition sensors, GPS, digital compass (multi-axis magnetometer), pressure sensors, environmental sensors, energy sensors, optical sensors, etc., to control headset operation, peripheral device operation or a software application program executing on the headset, the peripheral device, system or network.

A description of example embodiments follows.

Figure 1A:
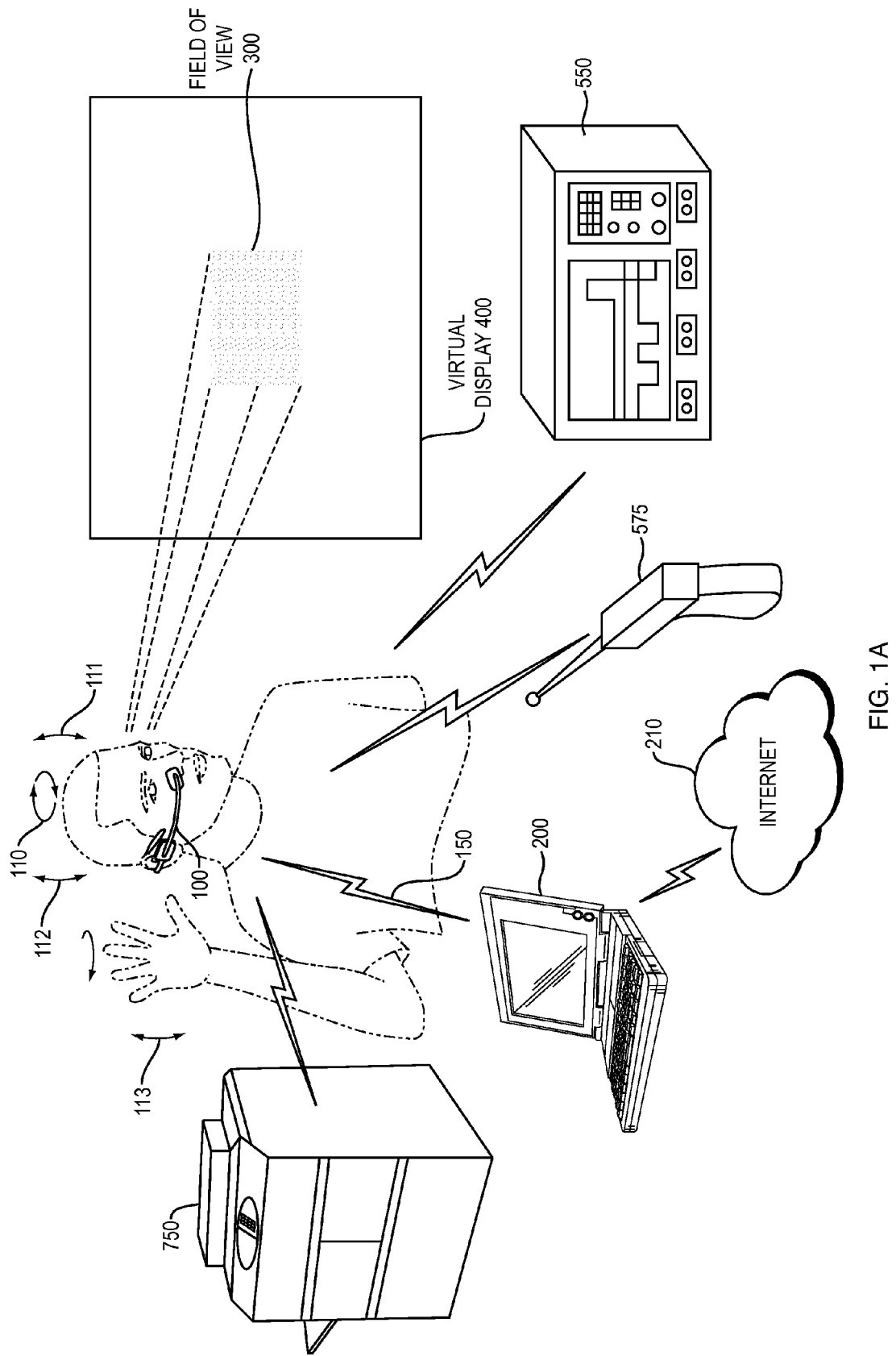
FIG. 1A is an illustration wireless computing headset device embodying the present invention and communicating with a plurality of host devices, where a person using voice commands, hand gestures and/or head movements controls a host computer, virtual display and/or field of view.
Figure 1B:
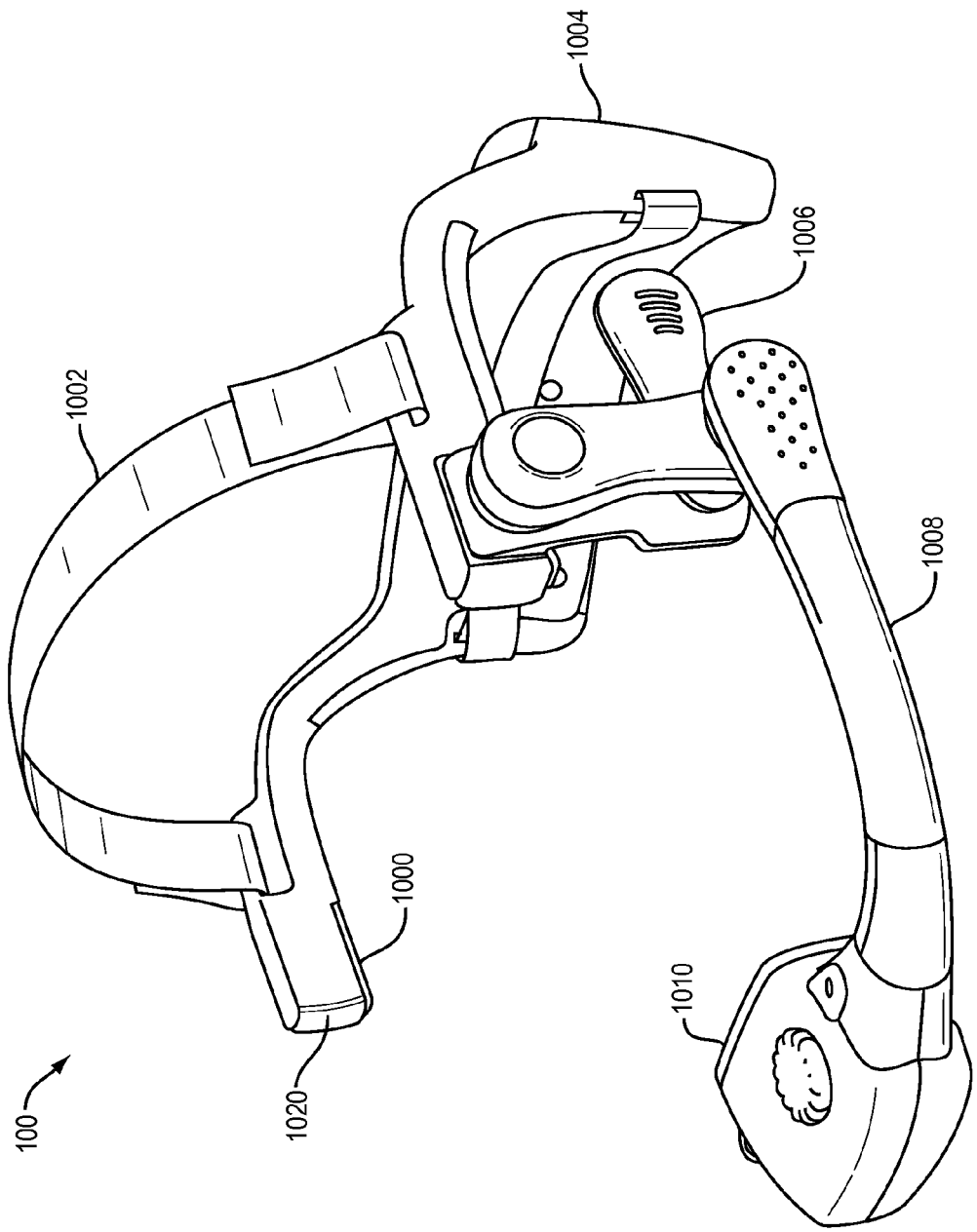
FIG. 1B is a more detailed view of the wireless computing headset, including a peripheral port, of the embodiment of FIG. 1A.

FIGS. 1A and 1B depict a wireless hands-free video computing headset (or headset computer (HC) or head mounted display (HMD)) 100 containing one or more microdisplays, local processors, wireless transceivers for the communication of data, which may include audio/voice, and/or graphical/video data, which may, or may not, be further integrated with one or multiple peripheral device. Examples of such integrated peripheral devices include, but are not limited to, microphones, speakers 1006 (shown in FIG. 1B), 3 axis to 9 axis degrees of freedom orientational sensing, geo-positional sensors, atmospheric sensors, health condition sensors, GPS, digital compass (multi-axis magnetometer), flashlight, altimeter, pressure sensors, various environmental sensors, personal sensors, energy sensors, optical sensors and/or cameras.

The wireless hands-free video computing headset 100 can include a microdisplay device 1010 (shown in FIG. 1B) to present information to the user graphically, and can use an input device such as head tracking accelerometers, gyros, or a camera or cameras to detect movements 110, 111, 112, such as head movements, hand motions and/or gestures 113, along with optional voice commands, to provide remote control of applications running on either a local processor or a remote host processor in various ways.

The example embodiment depicted in FIG. 1A shows a wireless computing headset device 100 (also referred to herein as a headset computer (HC) 100, video eyewear device 100, or head mounted display (HMD) 100) that incorporates a high resolution (WQVGA or better) microdisplay element 1010 (shown in FIG. 1B) and other features described below. Audio input and/or output devices, including one or more microphone(s), input and output speaker(s), geo-positional sensing, 3 axis to 9 axis degrees of freedom orientational sensing, atmospheric sensors, health condition sensors, GPS, digital compass, pressure sensors, environmental sensors, energy sensors, acceleration, position, altitude, motion, velocity or optical sensors, cameras (visible light, infrared (IR), ultra violet (UV), etc.), additional wireless radios (Bluetooth®, Wi-Fi®, LTE 4G Cellular, FM, etc.), auxiliary lighting, range finders, or the like, and/or an array of sensors embedded in the headset 100 and/or attached to the device 100 via one or more peripheral ports (not shown in detail in FIG. 1). (Bluetooth is a registered trademark of Bluetooth Sig, Inc., of Kirkland, Wash.; Wi-Fi is a registered trademark of Wi-Fi Alliance Corporation of Austin, Tex.) Also typically located within the housing of device 100 are various electronic circuits including, as will be understood shortly, a microcomputer (single or multi-core), one or more wired or wireless interfaces, and/or optical interfaces, associated memory and/or storage devices, various sensors, and a peripheral mount or mounts such as a "hot shoe".

The HMD 100 wirelessly communicates 150 with one or more host processors. The host processors may be integrated into such devices as a typical personal computer (PC) 200, meteorological, diagnostic, or other test equipment 550, including wireless test probes 575, and/or any other computing device including, but not limited to, printers 750, thermostats, or onboard computer systems of a vehicle (not shown). The wireless hands-free video computing headset 100 transmits commands 150 to a host 200 and receives replies based on those commands.

The reply communications 150 received by the HMD 100 may include status messages from the host processor 200, indicating the state of that computing device, data resulting from self-diagnosis processes, or other information.

In an alternative embodiment, HMD 100 communications 150 may include messaging to facilitate and execute diagnostic procedures utilizing one or more expert decision trees.

In a yet further alternative embodiment, HMD 100 communications 150 with the host processor may include transmitting and receiving audio, graphical, and/or video data to/from a live expert in real time.

In a yet further alternative embodiment, HMD 100 communications 150 with the host processor may include video of a three-dimensional representation of the user's body, which may include representations of physical and non-physical objects in the user's proximate environment, and/or an overlay of an expert body to provide expert guidance to the user.

FIG. 1B is a perspective view showing more detail of the device 100. The device 100 includes generally a frame 1000, a strap 1002, a back section or housing 1004, speaker 1006, cantilever or arm or boom 1008 and microdisplay subassembly 1010. One end of the frame 1000 has a port 1020 for carrying or otherwise coupling an accessory as will become clear later below.

FIG. 2A is a right side perspective view of the HMD 100 (FIG. 1B) as worn by a user where a camera accessory 1060*a/b* has been placed in the port 1020. The camera accessory 1060*a/b* can include both audio and video sensing and recording capability. The single camera accessory 1060*a* may for example, have a small form factor similar to a "bullet cam". The multiple camera accessory 1060*b* may for example, have a similar small form factor. As will be explained further below, user inputs, which may include head motion(s) 110, 111, 112, hand gesture(s) 113, and/or voice command(s), are provided by the user to control the settings of the display 1010, the camera accessory 1060*a/b*, and to perform other functions.

Figure 2B:
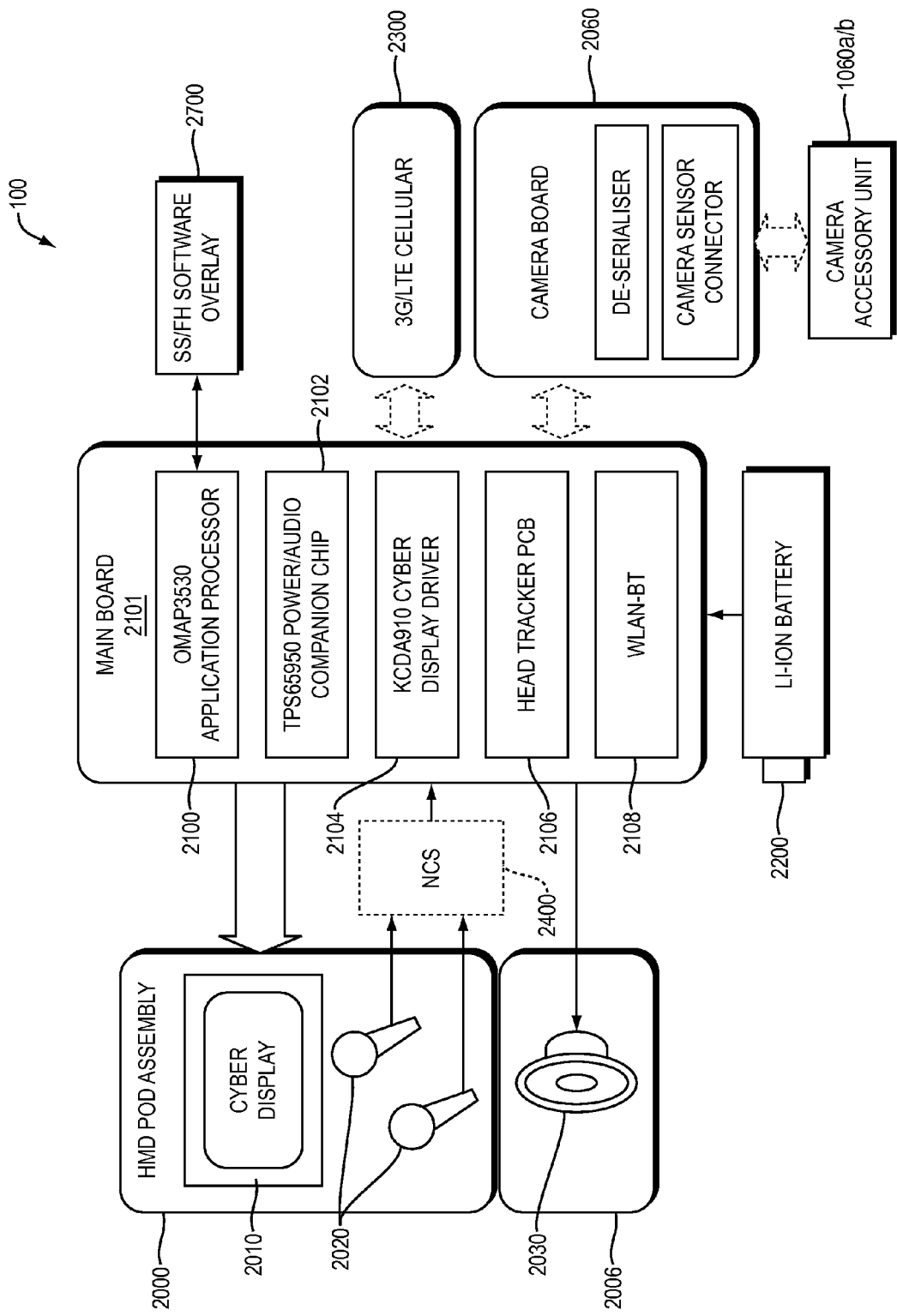
FIG. 2B is a high level block diagram of the components internal to the HC assembly of FIG. 2A.

FIG. 2B is a simplified high level block diagram of a non-limiting example embodiment of the HMD system 100. These components are integrated into the HMD housing 1004 (shown in FIG. 1B). The HMD system 100 may include a pod assembly 2000 that places the aforementioned microdisplay 2010 (1010 in FIG. 1B) and one or more microphones 2020 on a boom 1008 (FIG. 1B) that can be located near the user's eye(s) and mouth. A separate speaker pod 2006 (1006 in FIG. 1B) places speaker(s) 2030 about the users ear(s). Other HMD system 100 electronics are placed on or in the frame 1000 (FIG. 1B) in an appropriate location (such as rear portion 1004 in FIG. 1B) and include an Open Media Application Platform (OMAP) local processor 2100, a power/audio companion chip 2102, a display driver 2104, a head motion tracker 2106, circuit board 2101 and wireless LAN/Bluetooth interface 2108. Also located in or outside of the rear housing is a power source, such as a lithium ion battery 2200.

The display driver may communicate over a cellular or similar network 2300 to receive image data, video data, or the like for display on the microdisplay 2010, 1010.

Further the head motion tracking of circuit 2106 can receive input from camera assembly 2060 having cameras 1060*a,b* in addition to other sensors, such as a magnetometer, GPS, accelerometer, etc. Camera circuit assembly 2060 includes a camera sensor feed input to head motion tracker circuit 2106.

The application processor 2100 may be configured with various software programs in whole or part. A software overlay 2700 is one example further described below.

Hands free navigation and command of processor 2100 (and/or executed programs) operation is then achieved by navigation and control subsystems (with or without noise cancelling system) 2400.

The end user's voice input through microphones 2020 produces user computer interface commands. The subsystem 2400 is received by subsystem 2400 and outputs the generated commands to processor 2100 executing and operating certain software programs (2700) for example locally (in whole or part) or remotely through network 2300. In turn, the software program through processor 2100 manipulates elements for the display. Display driver 2104 responsively renders the corresponding display (at 2010, 1010) updated as a result of the user issued voice command.

Figure 3:
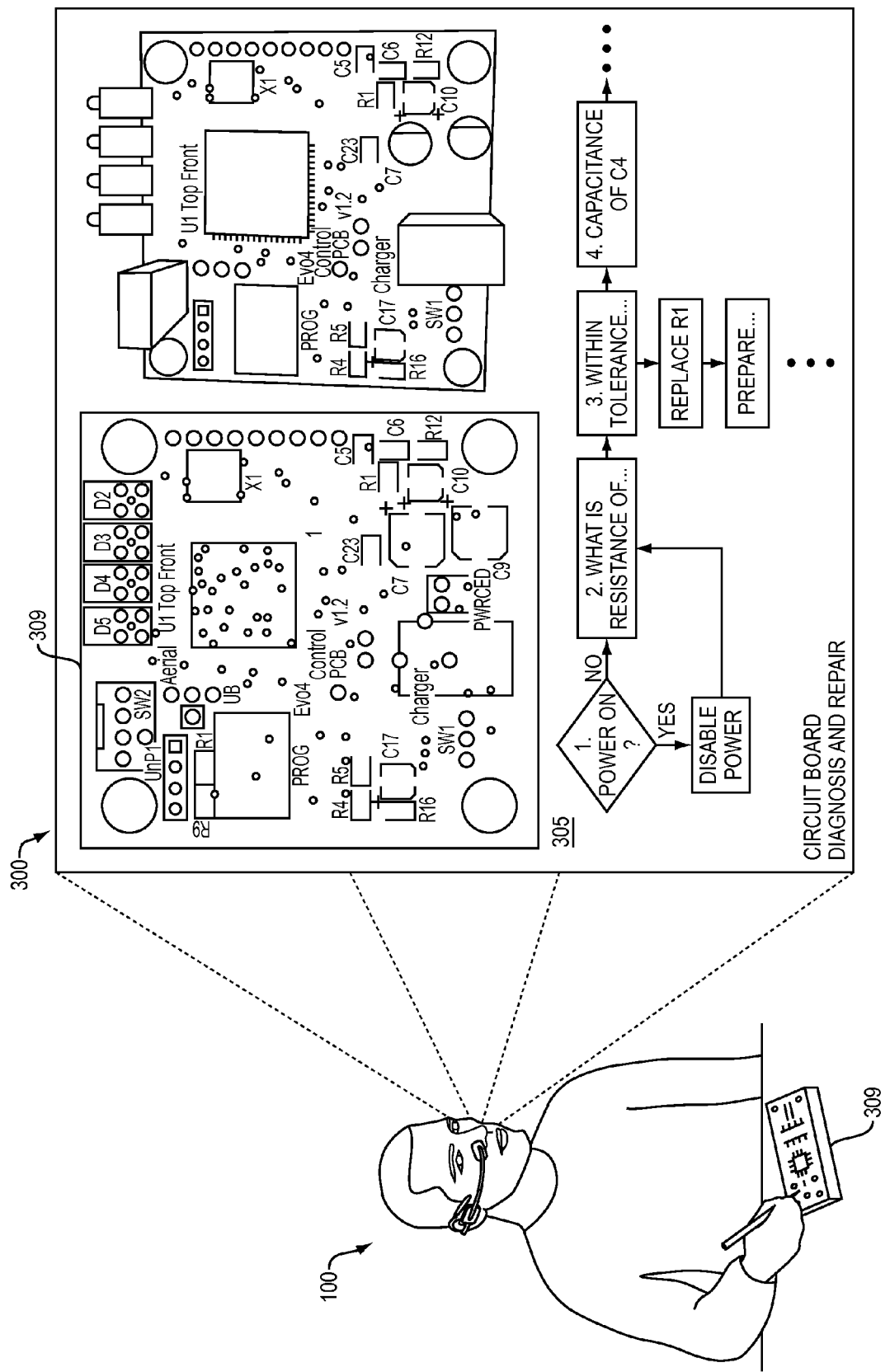
FIG. 3 is a high level diagram illustrating use of the wireless computing headset device in a method of local expert diagnosis and repair.

FIG. 3 is an example embodiment illustrating the wireless hands-free graphical video and/or computing headset 100 being used to perform "local" diagnostic and repair (not shown). The wireless hands-free video computing headset 100 runs an expert diagnostic software module locally on the HMD 100. The example embodiment of FIG. 3 illustrates using the locally running diagnostic software module to assist the user in printed circuit board (PCB) diagnosis and repair, such as by displaying (screen view 300) to and leading him or her through a sequence of steps 305 to perform diagnosis and repair a printed circuit board 309.

Figure 4A:
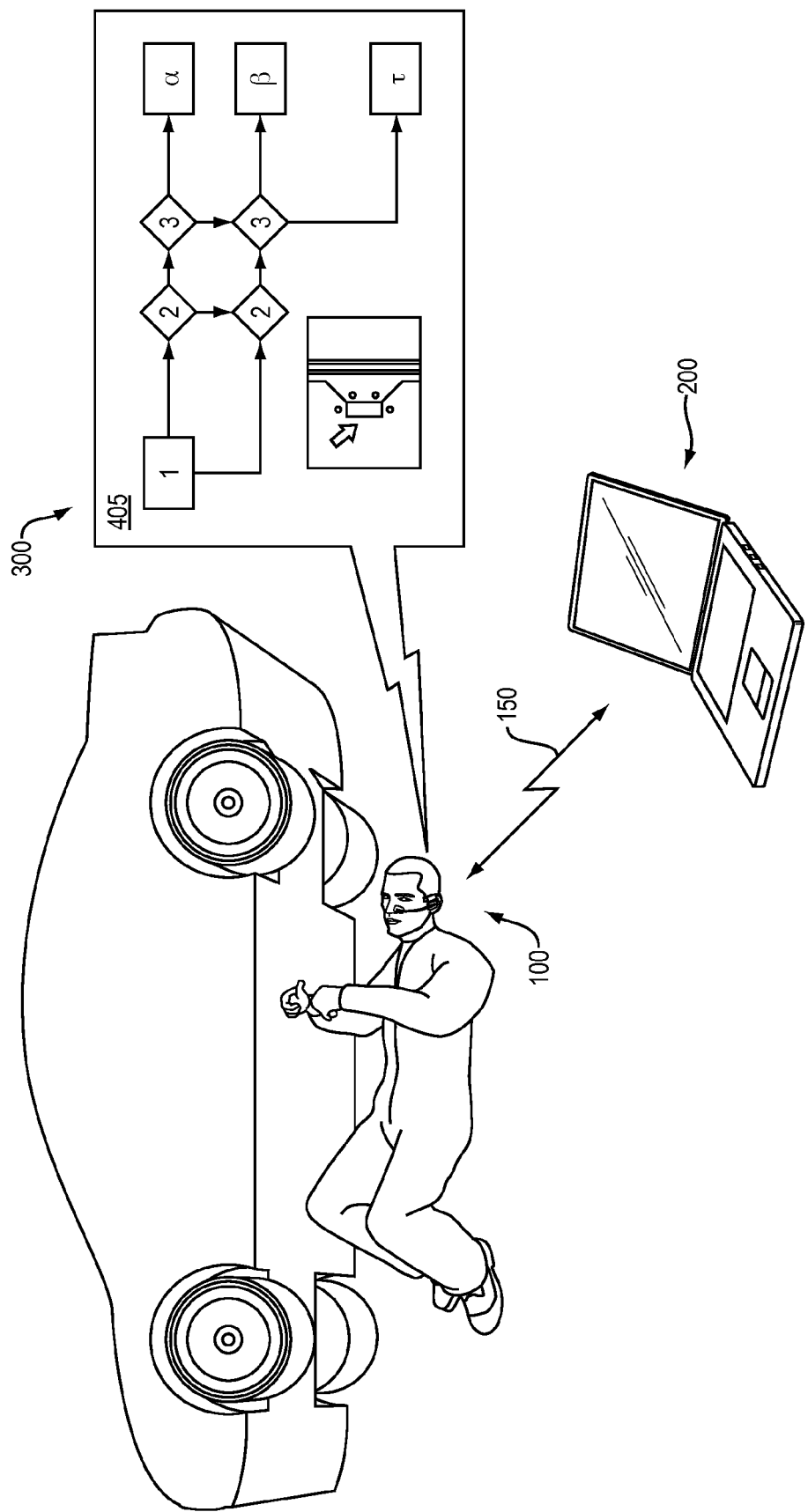
FIG. 4A is a high level diagram illustrating use of the wireless computing headset device in a method of remote expert diagnosis and repair.

FIG. 4A is an example embodiment illustrating the wireless hands-free graphical video and/or computing headset 100 being used to perform "remote" diagnostic and repair. The example embodiment of FIG. 4A is similar to that of FIG. 3, with a difference being that instead of the diagnostic software module running locally on the wireless hands-free video computing headset 100, the HC 100 communicates with a host 200 to access the expert diagnostic software module that runs on a remote PC or server or embedded in specialized automotive test equipment, to lead the user through a set of diagnostic and repair operations, which may be illustrated as a flowchart 405 or in other ways. The host 200 communicates such flow charts, diagnostic repair operations, etc. to the remotely located hands free graphical video or computing headset (HC) 100 for local display to the user, while the user carries out such operations and steps as illustrated in FIG. 4A.

There currently exist various software implementations and solutions aimed at diagnostic and repair situations. These typically take the form of expert decision tree systems running on a standard PC. In such a typical situation, the software is presented on a typical PC screen, showing the user a list of options that best describe the situation to be diagnosed. In the typical case, questions are presented to the user, and the user must provide an answer back to the computer, usually using a mouse or keyboard for data entry.

Through a sometimes lengthy series of questions and answers, the software can drill-down into the details of a diagnostic problem. By guiding the user though a decision tree, the expert diagnostic software offers a solution to the problem at hand. The user will then follow the procedures outlined on the computer to fix the problem at hand.

Typically, the expert software runs on a PC, server, laptop, test equipment, or PDA which all require the user to look away from the subject of the diagnosis (e.g., vehicle engine, human body, or circuit board, etc.) in order to interact with the expert diagnostic software. All require the user to interact with the computer using a keyboard, stylus, mouse, or touch-gesture, which typically requires the removal of any gloves and requires the use of at least one hand, thus leaving at most only one hand free.

In enabling these expert systems on a HMD 100 remotely or locally, the user does not need to look away from the subject of diagnosis when utilizing embodiments of the present invention. He or she simply glances down or up into the microdisplay screen 1010 to view the computer output, but will not be required to look into a computer screen (or laptop) located elsewhere. The wireless hands-free video computing headset 100 allows the user to answer questions by speaking, by head movement 110, 111, 112, or even by hand movement 113 (FIG. 1A). The user of the wireless hands-free video computing headset 100 interfaces that headset with a local or remote processor that contains diagnostic software pertaining to the problem that he or she is trying to solve, or the repair that he or she is trying to make. On the video screen 1010 of the wireless hands-free video computing headset 100 the user is presented with a diagnostic decision tree. This allows the user to briefly glance down at the screen 1010 while continuing to work on the maintenance issue at hand. The user narrates and makes selections in the decision tree, such as selecting the option that best fits what the user is trying to fix, through either voice commands, head motions 110, 111, 112, or even hand motions 113. Similarly, in using computer driven text-to-speech, the pertinent questions being asked by the computer can even be spoken directly to the user. In essence, in this alternative embodiment, the need to even glance down into the screen 1010 is obviated. Further facilitation of the hands-free nature of the HMD 100 is possible by driving the head-worn computer system with speech recognition systems, so that the user can simply talk back to the computer to convey an answer to the expert system.

All of this leads to a more intuitive way to use expert systems: the user can always be looking at the subject being diagnosed, can have the computer ask him direct questions, and the user can reply with spoken voice responses or commands. This all leaves the user with hands free to smoothly attend to the task (without interruptions by having to remove his hands from the task to continue running the computer program interface).

As illustrated in FIG. 2A, one or more cameras 1060a,b can be added, either attached to the HMD 100 or removable, to augment the user's understanding of his or her subject matter. Further applications can benefit if the camera is sensitive to different wavelengths of light such as ultraviolet (UV) and/or infrared (IR).

For example, a mechanic may be looking at a car engine, trying to solve a problem. In ambient visible light there may appear to be nothing wrong with the engine. However, he or she can switch on his or her infrared camera to view the same scene, and now is able to detect unusual hot-spots in the engine that may represent a problem. This additional IR display is being viewed directly in the head-worn monocular display 1010 and does not require the user to keep looking away from the subject matter to keep referencing another computer screen or PDA. He or she simply needs to glance down or up to see the IR visuals. In this case it is useful, but not necessary, to have the camera 1060a,b attached to the head-set.

In another example, a technician may be performing nondestructive testing (NDT), which often utilizes the fluorescent properties of materials. Typically, a dark environment, in combination with a blue light, is used to accentuate the fluorescence. Equipping the HMD 100 with at UV camera 1060 (generally) can enable the user to switch on the UV camera (by voice or manually) to view the NDT scene, and now is able to view the fluorescence directly in the head-worn monocular display and does not require the user to keep looking away from the subject matter to keep referencing another computer screen or PDA or require the NDT to occur in a dark environment. The user simply needs to glance down or up into the microdisplay 1010 to see the UV visuals. Instead of needing an environment nearly free of ambient visible light the NDT can occur in normal ambient light. In this case it is useful, but not necessary, to have the UV camera 1060 attached to the HMD 100.

It may be useful to use more than one camera, such as a co-locating three cameras 1060b, for example visible light, UV, and IR cameras, on or off the remote video computing headset 100. The co-located cameras can be focused on the same object, each providing a video or graphical image to the HMD 100 through camera circuits 2060. In turn processor 2100 or the main board of the HMD 100 presents to user the output of each individual camera at the microdisplay 2010, 1010, and can alternate between the camera outputs being presented using a verbal (and/or in combination with a hand/head-motion) command. This can be useful to orient the user. For example, the user may need to reorient himself or herself when in a UV view, and can do so by switching to the visible light camera, which would provide a familiar and therefore orientating, view. It may also be useful to overlay the images, so that the user can view the output of several cameras at the same time; that is, fusing sensor imagery data in a hands-free environment. The HDM 1001 overlay software 2700 can process the video data provided by the co-located cameras 1060b to overlay the images. Alternatively, a host processor can be provided with the raw video data, process the overlay imagery, and provide it to the HMD for presentation to the user.

For example, a detective may be pursuing a person of interest, who is bleeding, in a crowded environment in which droplets of blood are very difficult to see in visible light. Using a HMD 100 executing overlay software 2700, with a cluster of collated cameras 1060b, including visible light and UV cameras, can provide the detective with a fused video display at 2010,1010 that makes the blood droplets visible, enabling him or her to more easily track and pursue the person of interest.

Use of the disclosed method of diagnostic and repair may include, but is not limited to, diagnosing and repairing electronics or vehicular failures, or diagnosing medical conditions and applying treatment.

For example as depicted in FIG. 4A, the method of local diagnosis and repair using a HMD 100 can be used by a mechanic to diagnose and repair an oxygen sensor of an automobile. Suppose that the automobile's oxygen sensor must be replaced because of a diagnostic trouble code (DTC) for example either a Bank1-Sensor1 or a Bank1-Sensor2 sensor fault code on an OBDII car. First, the mechanic-user must answer some initial diagnosis decision tree 405 questions, such as vehicle make, model, year and mileage. The questions can be presented to the user graphically 300 through the microdisplay 2010, 1010 and/or audibly through the speaker(s) 2030, 1006.

Through a series of steps 405, that may include interactive instructions, questions, and/or descriptions presented to the mechanic-user, the HMD 100 method of local diagnosis and repair expertly guides the user-mechanic through the diagnostic and repair process for the oxygen sensor, including: locating the catalytic converter on the underside of the automobile, removing the fastening hardware and hardware mounting of the catalytic converter, identifying which sensor—pre-catalytic converter or post catalytic converter—must be replaced, removing the appropriate connectors, etc. The set of instructions 405 and/or descriptions may be presented to the user through either vocal or graphical instructions and/or descriptions, or a combination thereof. The information presented to the user-mechanic through the microdisplay 2010, 1010 may include text and/or graphical images, such as repair manual diagrams.

The oxygen sensor is typically located on the underside of most vehicles. Thus, the disclosed method of a hands-free diagnosis and repair using a HMD 100 is a vast improvement over computer diagnostic systems using traditional user interfaces. The mechanic-user's efficiency and productivity are increased by using the disclosed method of local diagnosis and repair using a HMD 100 because the mechanic user can maintain focus and concentration on the physical objects of the work, instead of climbing up and down from the working position underneath the vehicle in order to interface with a traditional computer diagnostic system.

In the alternative example embodiment of FIG. 3 mentioned above, the wireless hands-free graphical video and/or computing headset 100 can be used to perform local diagnostic and repair. Expert diagnostic software can be loaded locally onto the HMD 100, for example by downloading it from a network using one of the available communications interfaces 2108, or it can be loaded onto an electronic media storage device, such as a micro SD card, which can be inserted into a corresponding electronic media accessing device, which is one of the peripheral devices accessible to the local processor. In this way, the HMD 100 (processor 2100) has a copy of the expert diagnostic software located locally on-board the HMD device 100, and the user can use the software to perform diagnosis and repair in a manner similar to that described above.

Figure 4B:
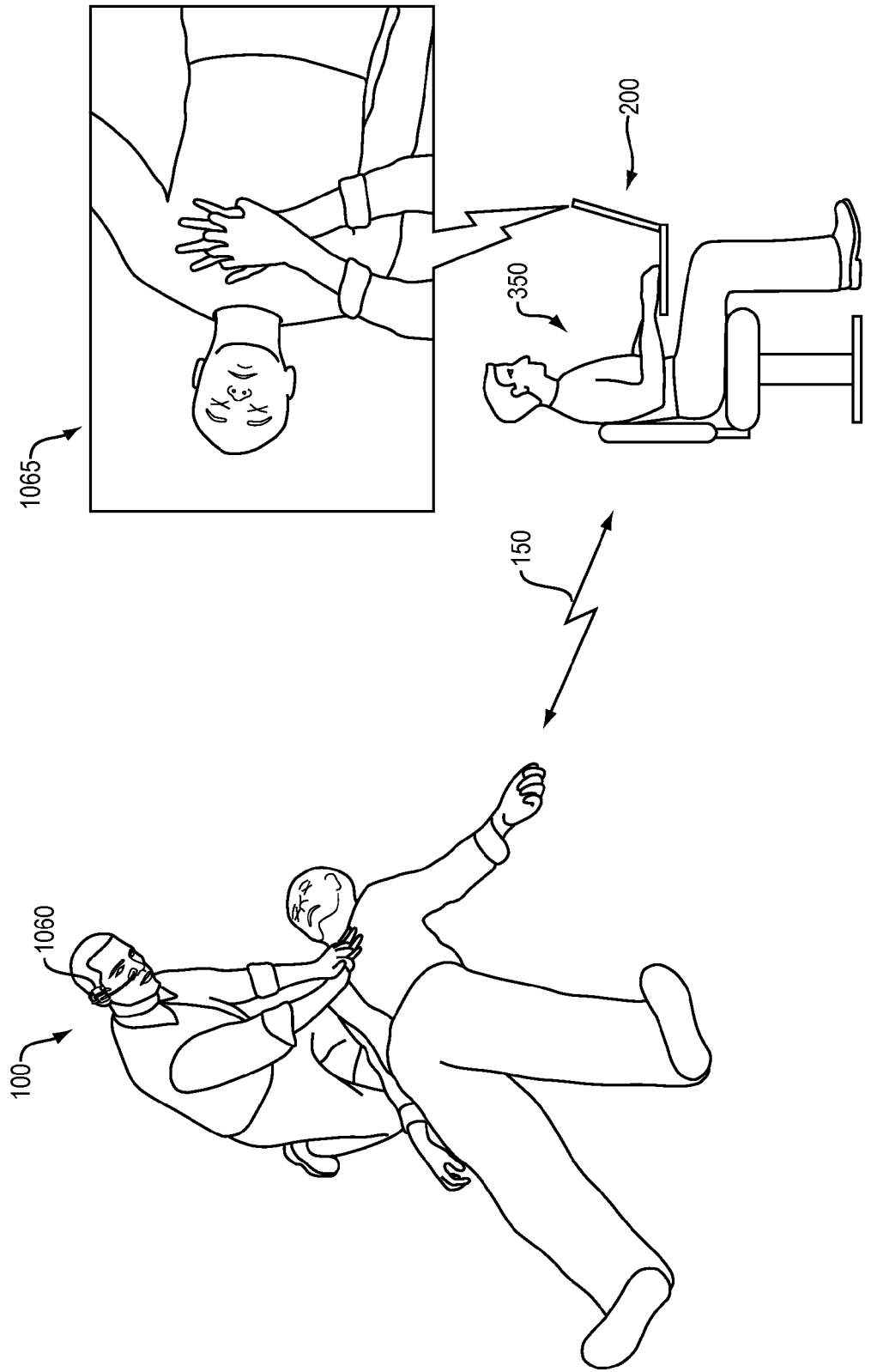
FIG. 4B is a high level diagram illustrating use of the wireless computing headset device in another method of remote expert diagnosis and repair.

FIG. 4B is another example embodiment of a method for remote diagnostics and repair. In this example embodiment, the wireless hands-free video computing headset has a network enabled camera 1060. In adding network capabilities to the head-worn computing device, and adding a network enabled camera 1060, remotely located third parties 350 can take part in diagnostics and repair activity. The network enabled camera 1060 may be, but is not limited to, visible, infrared, or ultraviolet light cameras.

In a preferred example embodiment, the network enabled camera 1060 is integrated with and mounted on the HMD 100 in such a manner that the camera 1060 provides video imaging approximating the user's field of view 1065. This video is communicated from the headset to one or more remote parties over a wireless communications network 150, such as a cell phone network or the internet. The remote party 350 is provided with video 1065 approximating what the headset user sees. A remote party 350 may be an expert or experts, who can now view the scene in front of local user, via real-time video. The real-time audio capability of the HDM 100 enables the remote expert 350 to converse with the local user. In addition, the remote expert 350 can feed information to the local user's microdisplay screen 1010, such as new additional information, or can simply highlight parts of the screen already available to the user. In this way a "Remote Expert" scenario is enabled.

The alternative example embodiment described in FIG. 4B is particularly useful in situations where immediate emergency medical treatment is needed. The disclosed alternative method of remote expertise can be used to remotely provide an emergency medical technician (EMT) or a military field medic with access to the expertise necessary to diagnose and treat a patient. In such situations, the medic-user can communicate with an expertly trained remote physician so that the remote physician can provide the necessary guidance to diagnose and treat the patient. The expert can give instructions to the user, via voice commands, instructing the user what to do.

For example, the victim could be suffering from trauma due to an improvised explosive device (IED) in a battlefield situation. The medic-user may only be trained in triage situations and may not have the necessary knowledge, expertise, or experience to save the victim of the IED. The medic-user, located on the battle-field, can communicate with a remote physician at the base, or anywhere in the world, using the HMD, to determine what can be done to save the victim. The user can communicate with the remotely located expert 350 to determine and execute the necessary medical procedures that will diagnose the victim and further execute the procedures necessary to treat the victim's condition. The benefits of the wireless hands-free video computing headset enabling the medic-user to use his hands to work on the patient without having to use them to interface and communicate with the remotely located expert.

A further benefit is the increased sterility and cleanliness that the wireless hands-free video computing headset enables. The user that is treating a patient does not have to remove his or her gloves to interface with a computing device. Often, when medical treatment providers are treating patients in a triage situation, where time is of the essence, he or she will neglect to remove his or her gloves when interfacing with a computing device, particularly a device with a touch-screen interface, thus contaminating the device and increasing the probability of spreading disease. The HMD 100 can eliminate such cross-contamination, and providing a more sterile environment. A still further benefit is the enablement of providing the remote expert with contiguous time (approximating real-time) information—the expert receives video and/or audio provided from the HMD 100—of the situation that the medic-user is encountering as he or she is encountering it.

Figure 5:
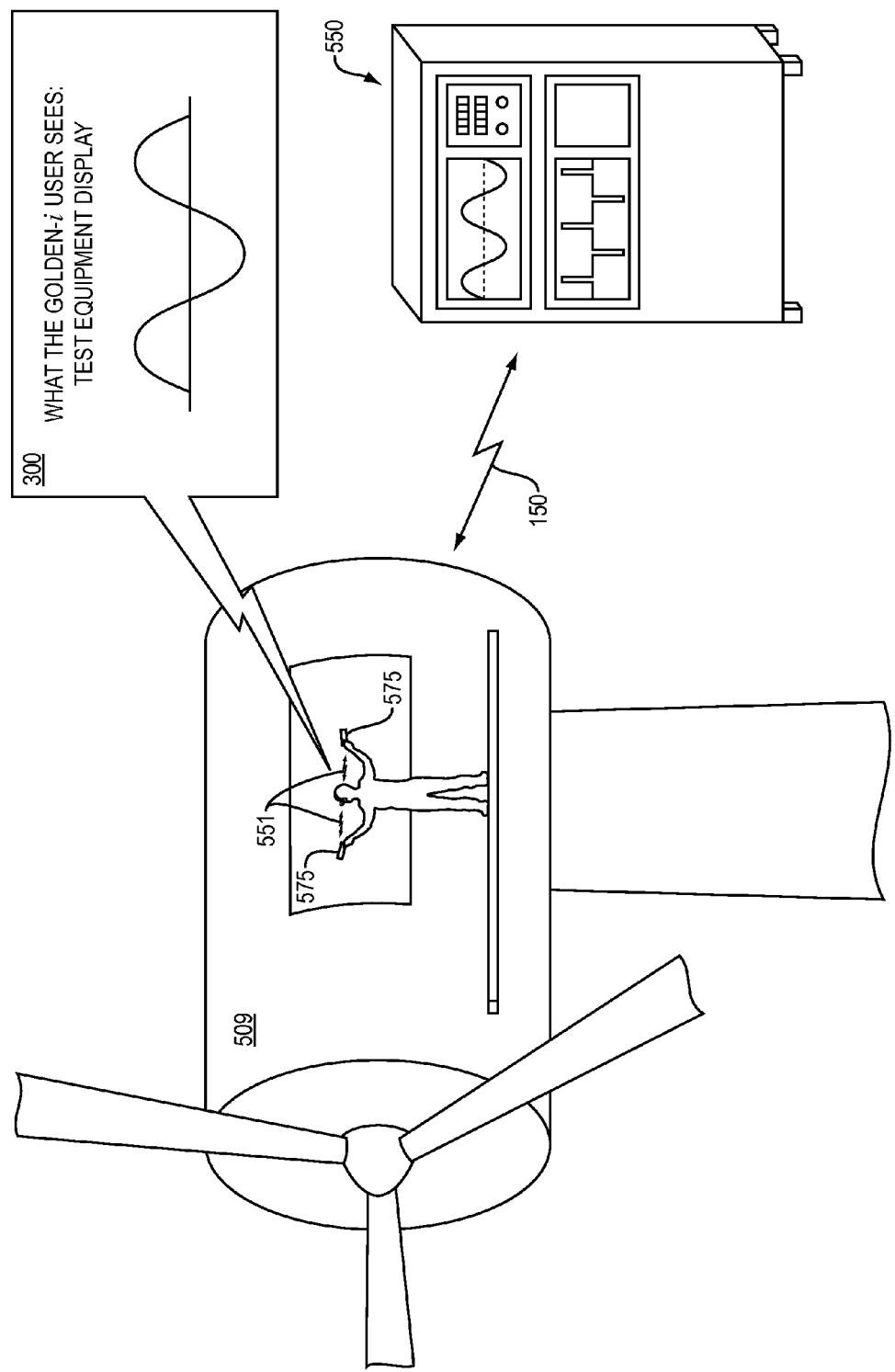
FIG. 5 is a high level diagram illustrating use of the invention wireless computing headset device in a method of local diagnosis and repair using test equipment.

FIG. 5 is yet another example embodiment, in which the user of the HMD is working in an industrial situation where he or she is using mobile test equipment probes 575 to diagnose and assess equipment in the field 509. In this example embodiment, the mobile test probes 575, such as, but not limited to, alligator clips, pencil probes, logic tracers, radio frequency (RF) bayonet N-type connectors (BNC), light sensors, etc., communicate 551 to the wireless hands-free video computing headset. In turn, the wireless hands-free video computing headset communicates 150 to metrological or performance monitoring test equipment 550, which is remotely located. The test equipment analyzes the data received and provides visual output 300, such as the same graphical display available on the test equipment, or the raw or calibrated data measurements, to the user of the wireless hands-free video computing headset. The user may be presented with a video display of the results of the test equipment on the microdisplay of the HMD 1010, as well as diagnostic and repair procedures.

Rather than having to move test equipment 550, which is often a cumbersome task due to the fact that it is typically large and heavy, in close proximity to machinery or equipment 509 to be tested, the user of the wireless hands-free video computing headset 100 can communicate 150 remotely to the test equipment 550, thus freeing up the user to be more mobile and efficient. Referring to the example embodiment illustrated in FIG. 5, the device under test is a wind turbine 509 located high above the ground on a support structure. The hand-held remote test probes 575 communicate 551 to the wireless hands-free video computing headset 100. In turn, the wireless hands-free video computing headset 100 communicates 150 to the test equipment 550 that is remotely located, on the ground. The test equipment 550 analyses the data received and provides a visual output 300, such as the same graphical display that is presented on the test equipment 550 itself, to the user of the wireless hands-free video computing headset 100.

Figure 6:
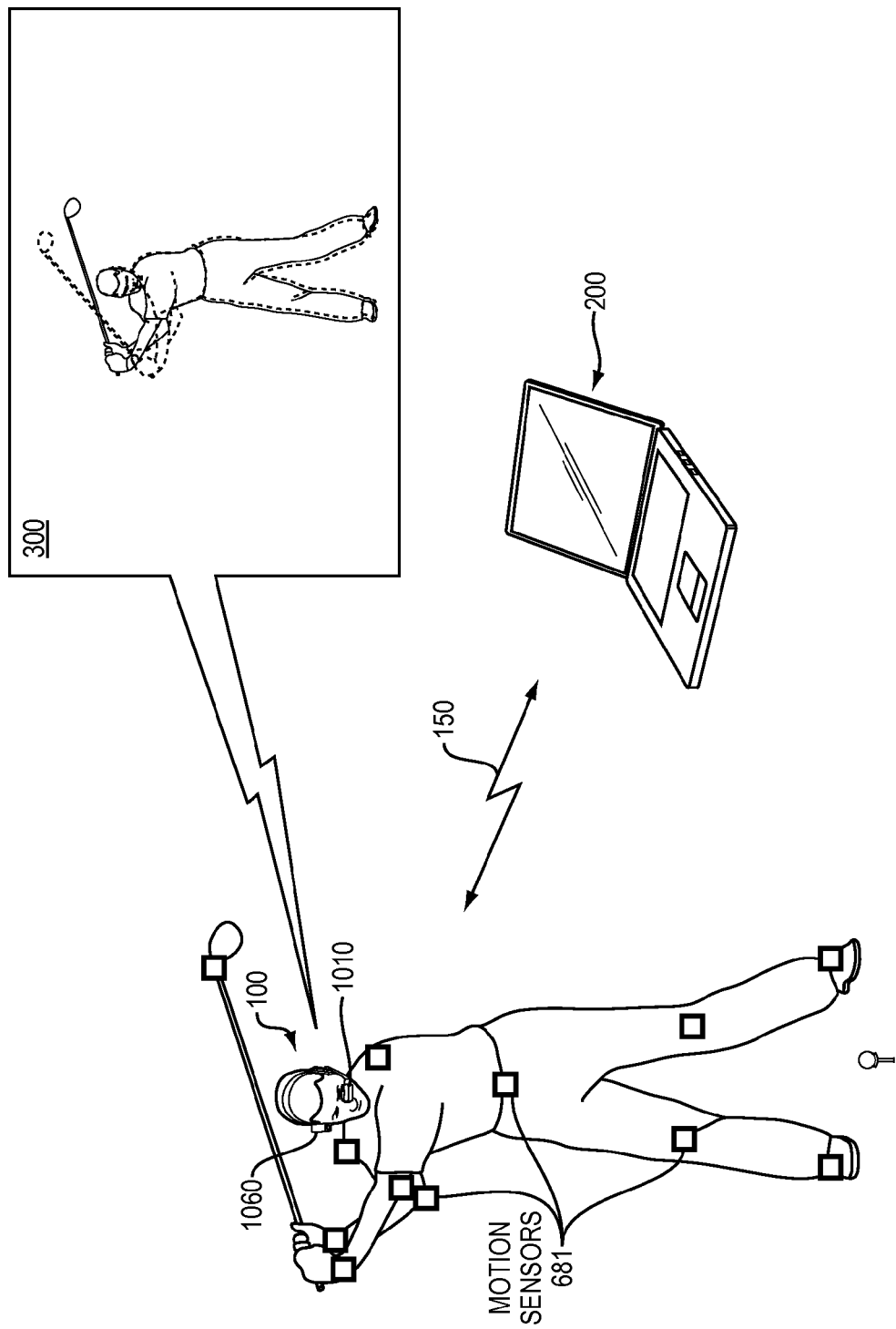
FIG. 6 is a high level diagram illustrating use of the invention wireless computing headset device in a method of expert training for physical tasks.

FIG. 6 illustrates a yet further example embodiment, a method of training a user of the wireless hands-free video computing headset (HMD) 100 in a physical activity. Interactive training systems are used today for industrial training systems and many sporting applications.

There are a number of ways to track the user's body. Common methods are optical recognition, using a camera to view the scene and software to analyze it. Alternatively, electronic and/or reflective tags 681 can be worn on the body and at the hands and feet of the user which can relay movement and position change information back to a computer 200. All of these systems can be implemented and networked with the HMD 100.

The user is situated with a motion capture technology, which can be sensors 681 attached the user's body, or a plurality of cameras capturing the user's motion, or some other such technology. The motion sensor information is communicated 150 to the wireless hands-free video computing headset 100 and/or the host processing device 200 such as a typical PC.

The PC 200 contains software presenting a three-dimensional representation of the ideal physical activity. It presents a model (visually output as 300) of that ideal physical activity in three-dimensional space, as well as the user's actual physical activity in three-dimensional space, to the user. By the user having his hands free and body unencumbered while being able to see the video information 300, the user can make the necessary adjustments to compensate to more closely approximate the ideal expert physical action.

An example of this is golf swing training. The wireless hands-free video computing headset 100 allows the user to easily access and view a three-dimensional representation 300 of his or her swing compared to the expert swing, as the user is conducting his or her swing. The user does not need to alter his or her body position in any way in order to receive the feedback from the host processor, he or she can simply glance, i.e., only moving his or her eyes, at the video display 1010 of the wireless hands-free video computing headset 100. This enables the user to quickly and accurately correct his or her swing to better emulate the expert swing presented on the microdisplay 1010.

The example method embodied can also be used in any other situations where proper physical body alignment and posture are of importance to the actions being conducted. Another example of such a situation is in the handling of nuclear waste from a nuclear power plant. In such a situation, the nuclear technicians can be trained, using the HMD 100 method of physical training, to handle the very sensitive nuclear materials in a way that increases and promotes safety. The user is presented with his or her body's actual physical position and can quickly and easily access and use that information to adjust and modify his or her body's physical position to more closely approximate the expert body position.

A benefit of the example method embodied of training using the HMD 100 is that the user does not need to look away from his subject matter to see how his body position compares to the preferred or expert body position. In having this information displayed in real-time on the head-worn display, the user can just glance down or glance up to see the information. This especially beneficial when constant small adjustments to a user's position are needed, because it obviates the constant movement and repositioning of the head to look at a PC screen and back to the subject, which is cumbersome and can cause strain on the user.

Yet another benefit is the mobility of the HMD 100 is entire interactive training experience can be made fully mobile and is not tethered to a PC 200 and its optical recognition systems. It can happen in the field; it can happen at the heart of a nuclear reactor; it can happen on the golf-course.

Figure 7:
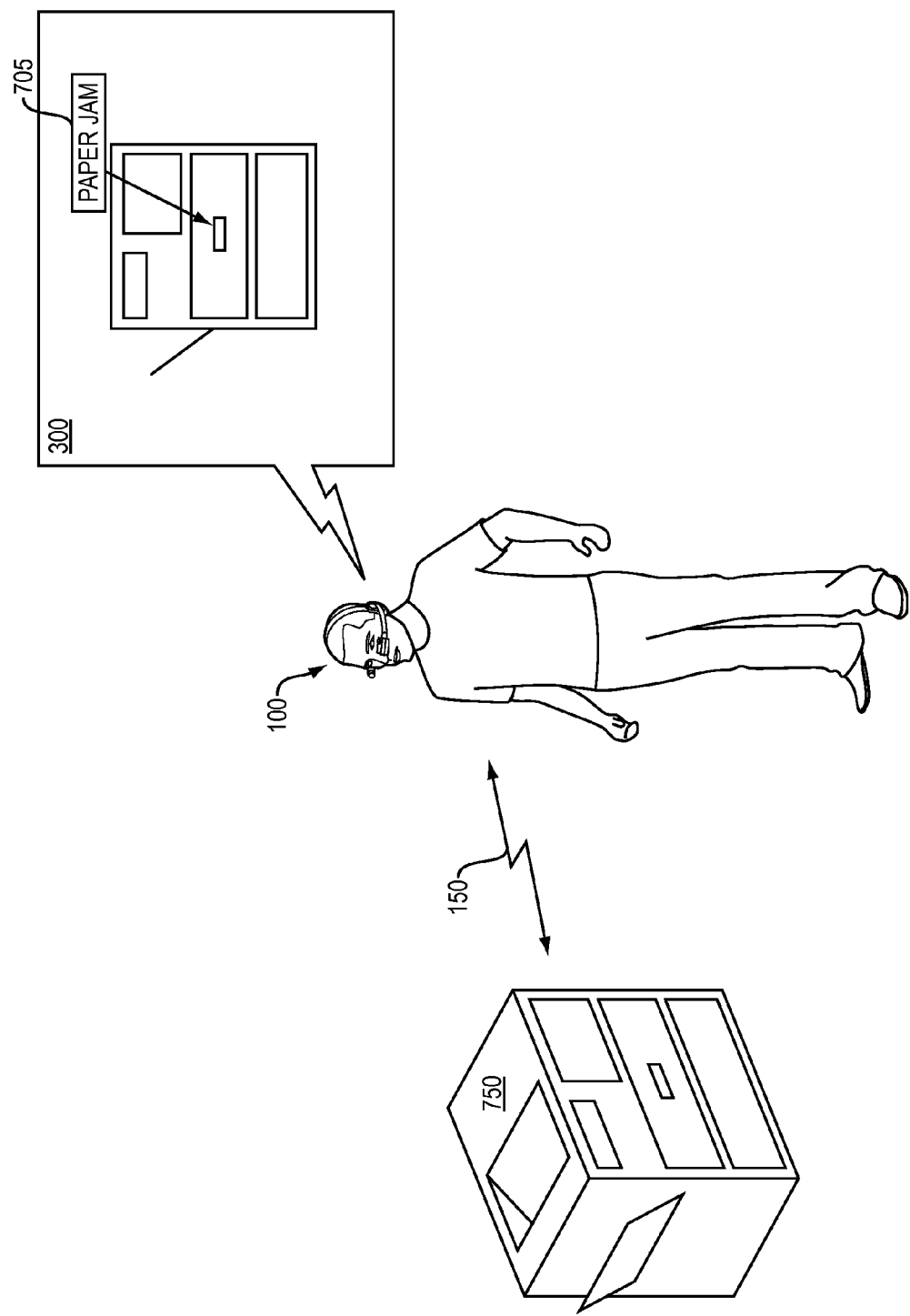
FIG. 7 is a high level diagram illustrating the use of the wireless computing headset device in a method of local diagnosis and repair, where the wireless computing headset device receives a status report from the host.

In the example embodiment illustrate by FIG. 7, a user wearing the headset 100 is presented with information from a machine or device 750 that contains a host processor 200. The HMD 100 wirelessly communicates 150 with the host processor. Host processors 200 (not shown) may be integrated into any computing device 750, such as a typical PC, printer, thermostats, or onboard computer systems of a vehicle. The wireless hands-free video computing headset 100 transmits commands to a host 200 and receives replies based on those commands. The host processor machine or device runs 200 diagnostic software that self diagnosis the machine or device. The host processor creates a reply that presents to the HMD 100 user what is the determined current status or state of the machine 750 (i.e., a diagnostic report). The HMD 100 receives replies that include status messages 705 from the host processor 200 indicating the state of that computing device, including data resulting from self-diagnosis processes.

For example, an industrial copier/printer 200 can communicate to the wireless hands-free video computing headset 100 that there is a paper jam 705. The user is first presented with a message 300, graphical or audible, indicating the copier/printer's status. Once the user chooses to address the message and communicates 150 this to the host processor 200, either through verbal commands, hand gestures, or head movements, or some combination thereof, the host processor 200 will present to the user with step-by-step actions to take to fix the issue. Other examples may include a vehicle communicating to the owner or a mechanic that the catalytic converter is malfunctioning, or that the engine is overdue for an oil change.

Figure 8:
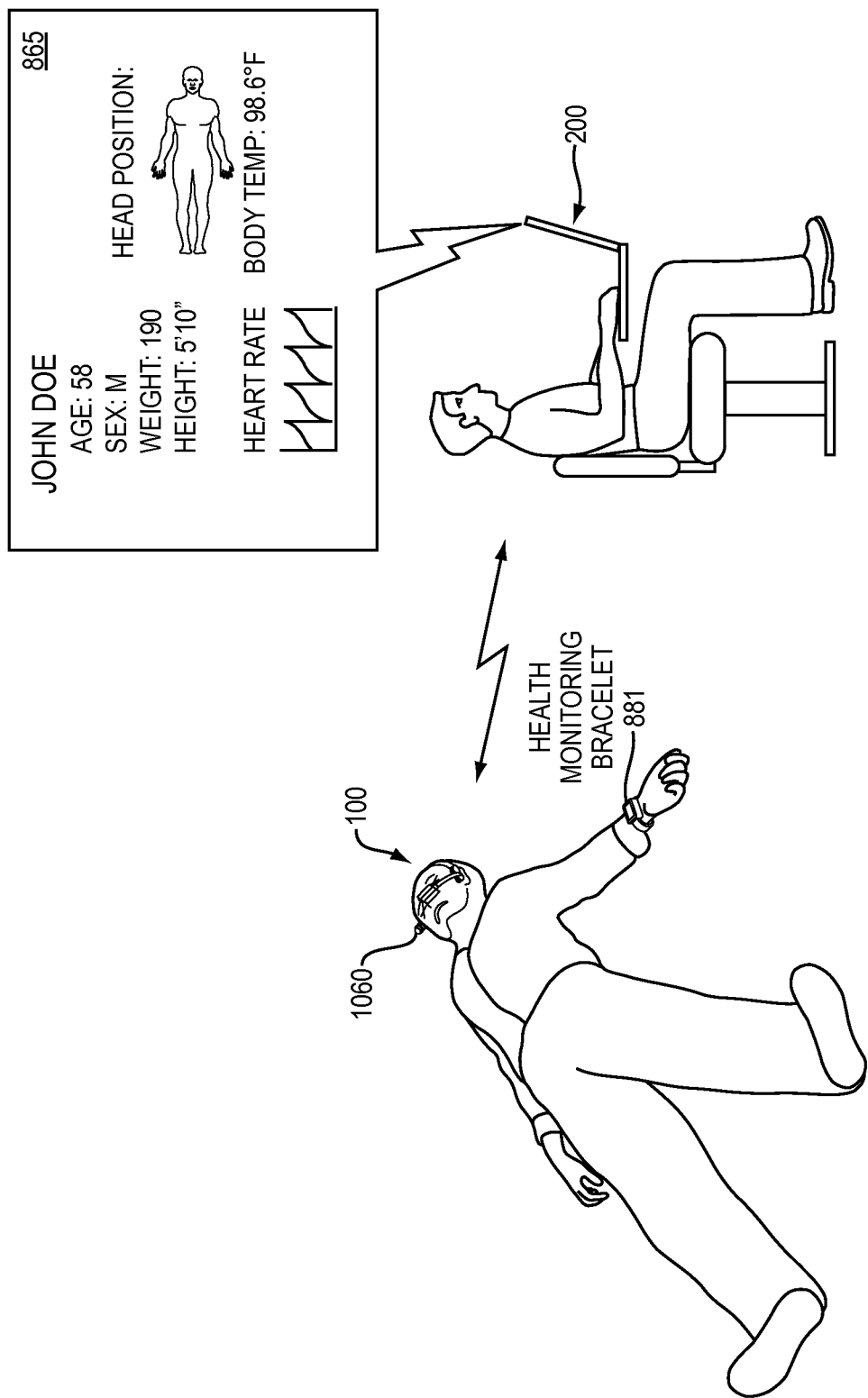
FIG. 8 is a high level diagram illustrating the use of the wireless computing headset device in a method of remote monitoring and assistance.

FIG. 8 discloses the use of the wireless hands-free video computing headset 100 in combination with a health monitoring sensor(s), which the user wears. The health monitoring sensor(s) 881 communicates to the wireless hands-free video computing headset 100 the status of the user's health. In the event that the user loses consciousness or has an accident, the health monitoring sensor 881 will alert the wireless hands-free video computing headset 100. The wireless hands-free video computing headset 100 will, in turn, communicate 150 to a remote monitoring terminal 200. At the remote monitoring terminal 200, an expert will assess the situation, with access to a record 865 of the user's vital health signals. The remote monitoring terminal will be able to communicate 150 to the user and determine whether the user is conscious or not. If the user is not conscious, the remote monitoring terminal expert can call 9-1-1, or emergency services, to provide emergency help to the user. Further, the remote monitoring terminal expert will be able to communicate with the user's emergency contacts, such as family members or business associates.

The health of the user can be monitored in several different ways using several different sensors, such as the 3 to 9 axis head tracking sensor, blood pressure sensors, oxygenation-rate sensors, respiration-rate sensors, heart-rate sensors (electrocardiogram (EKG), and/or electroencephalogram (EEG)), body-core temperature monitor, and perspiration loss sensors. Tracking of the sensors 881 can be done actively or passively in the background. The sensors can alert the HMD 100 if a sensor battery is low. The HMD 100 can monitor the plurality of health sensors 881 wirelessly through a Bluetooth® enabled personal area network (PAN). Head tracking can be used to monitor the position and location of the user's head. This can be useful to monitor whether the user is standing up, has fallen over, is hanging upside down or is in some other precarious position. The 3 to 9 axis sensors can also monitor whether the user's head is facedown or faceup, if he or she is lying down.

The hands-free computing headset 100 can capture the information of more than one Bluetooth® enabled health sensor 881 by restoring the sensors to see if they are on and that the data they are monitoring is within the normal limits. If the data is within the normal limits, fewer Bluetooth® data points need to be collected so the frequency of the data collected can decrease, thus saving computing power and battery operating power. However, in the event that the data received from the health monitors 881 is not within normal limits, increased data sampling can occur.

Data sampling can include using GPS and/or digital compass, etc. to monitor to users location. Tracking such data can provide information as to what happened to the user. This can be very useful in the event of a physical accident such as the user falling from a height, or a user being in a vehicular accident. The HMD 100 can provide the conditions leading up to an accident, similar to the functioning of a black box in an airplane.

Figure 9:
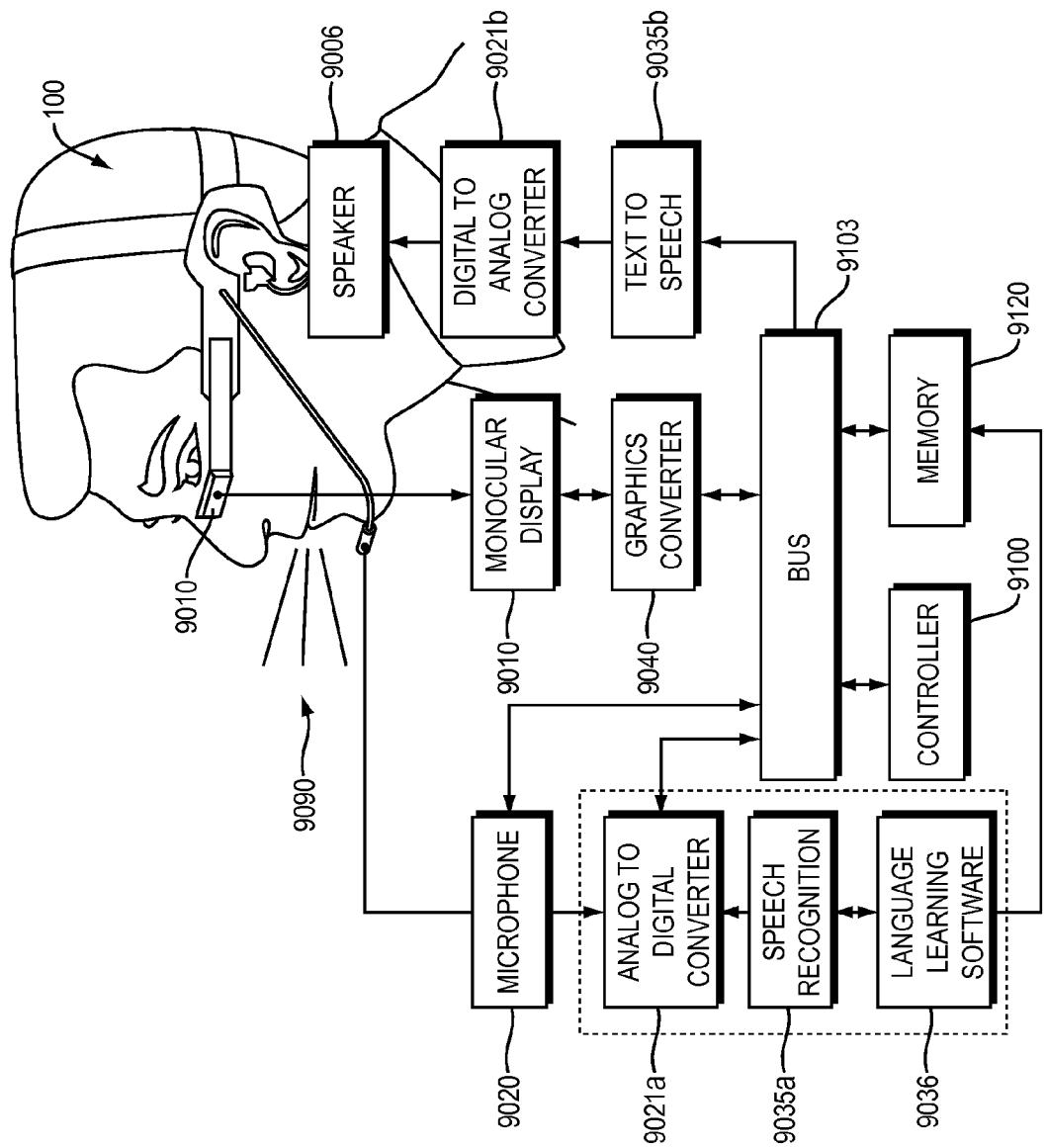
FIG. 9 is a schematic diagram illustrating the use of the wireless computing headset device in a method of expert speech diagnosis and be used to help the user learn a foreign language.

FIG. 9 shows the use of the wireless hands-free video computing headset 100 for expert speech diagnosis and be used to help the user learn a foreign language. The user can be presented with an image on the micro-display 9010 of a vocabulary word in a foreign language that the user is trying to learn. Many of the successful computer software programs for learning foreign languages employ a method in which an image is presented to a student visually in conjunction with a word which is presented audibly. The joint presentation assists in creating the association between that word and image in the student's mind. A student user of the HMD 100 can use language learning software module 9036, either locally or from a remote host 200 (not shown), in which the user is simultaneously presented with an image of a vocabulary word on the microdisplay 9010 and the audio of the word in the foreign language through the speaker 9006 of the headset computer 100. Because the headset computer 100 is also equipped with a microphone 9020, the student user can repeat the word and the language learning software can determine whether the student is pronouncing the word properly. If he or she is not pronouncing the word properly, the software 9036 can offer suggestions as how to correctly pronounce the word.

FIG. 9 shows a schematic diagram illustrating the modules of the headset computer 100. FIG. 9 includes a schematic diagram of the operative modules of the headset computer 100. For the case of a expert speech diagnosis and foreign language education controller 9100 accesses language learning software module 9036, which can be located locally to each HC 100 or located remotely at a host 200 (not shown). Language learning software module 9036 contains instructions to display to a user an image and present the word for the image in a foreign language jointly. The graphics converter module 9040 converts the image instructions received from the language learning software 9036 via bus 9103 and converts the instructions into graphics to display on the monocular display 9010. At the same time text-to-speech module 9035b converts instructions received from language learning software module 9036 to create sounds representing the word for the image to be displayed. The instructions are converted into digital sounds representing the word that the text-to-speech module 9035b the which feeds the digital to analog converter 9021b which in turn feeds speaker 9006 to present the audio to the user. Language learning software module 9036 can be stored locally at memory 9120 or remotely at a host 200 (not shown). The user can repeat the word for the image and the user's speech 9090 can be received at microphone 9020. The received speech is then converted from an analog signal into a digital signal at analog-to-digital converter 9021a. Once the speech is converted from an analog to a digital signal speech recognition module 9035a processes the speech into recognize speech. The recognized speech is compared against known speech and a language learning software module according to the instructions 9036. Suggestions on how to correct or improve speech can be delivered via the text-to-speech path audibly to the user at speaker 9006.

Figure 10:
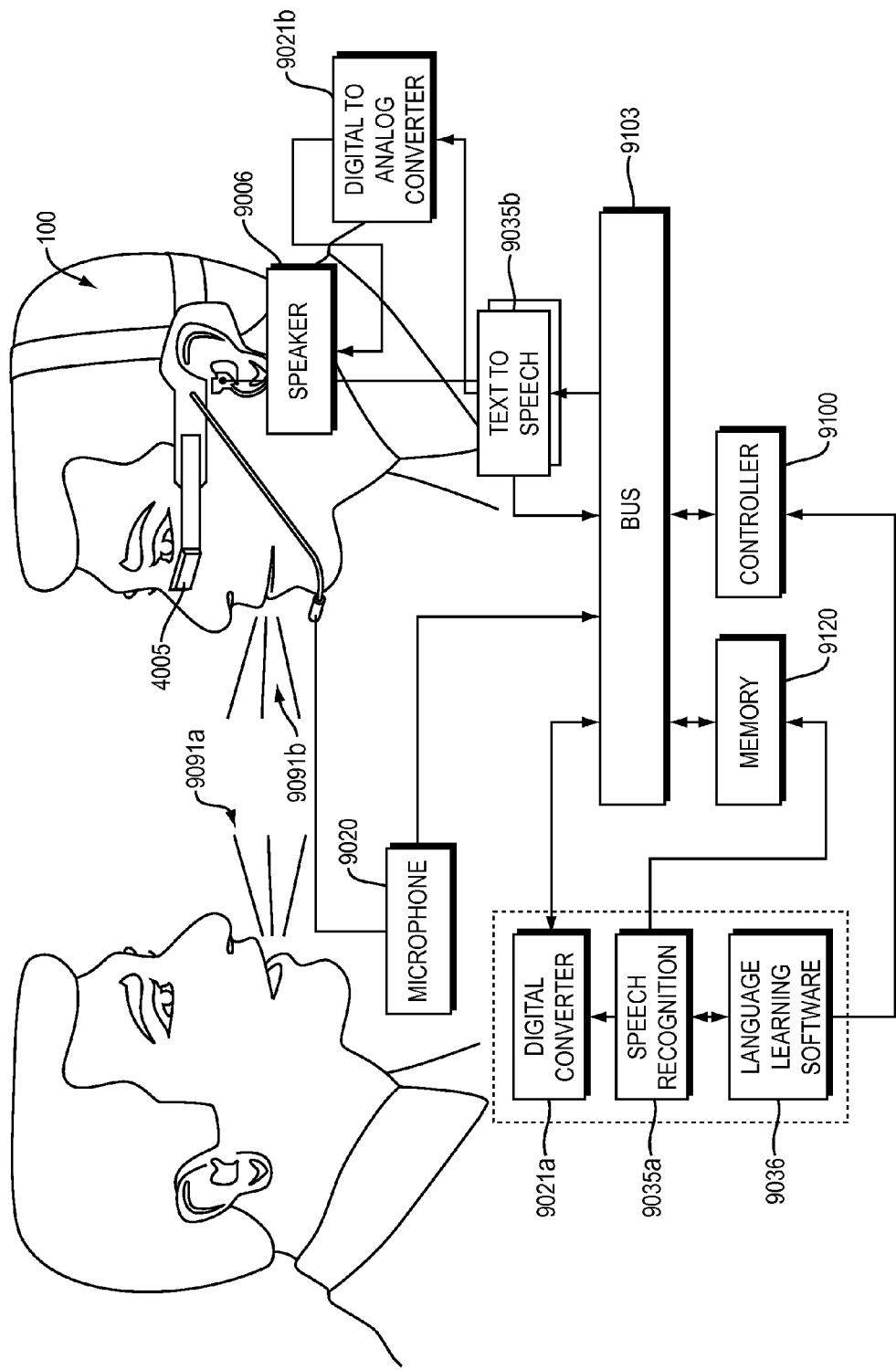
FIG. 10 is a schematic diagram illustrating the use of the wireless computing headset device in a method of expert speech translation to enable communication between a user and non-user speaking a foreign language.

FIG. 10 illustrates the use of the wireless hands-free video computing headset 100 for expert translation, translating speech in a foreign language 9091a into speech that the user is can understand 9091b. For example the user may be trying to have a conversation with a native Russian speaker. However, the user does not speak or understand Russian. The hands-free computing headset 100 can translate the spoken Russian 9091a into English 9091b by converting the input from a microphone 9020 into data which can be analyzed by a speech recognition software module 9035a, which is located either locally in a memory storage module 9120, or remotely at a host 200 (not shown) from the HMD 100, and provide a verbal translation output to the user through the speaker 9006 located on the headset 100. The hands-free computing headset 100 can be equipped with twin processors 9100, which would provide for dual translation. One processor translates from the foreign speech 9091a to the user's native speech 9091b; the other processor translates from the user's native speech to the foreign language 9091a so that the foreign non-user could understand the user.

Microphone at 9020 can pick up the foreign speech 9091a and as an input to digital converter 9021a. Once converted speech recognition module 9035a can perform speech analysis on the digital signal to recognize the speech in the foreign language. The recognize speech is then input into language learning software module 9036 which can contain translation module (not shown) in which the foreign-language 9091a is translated into the native user's language 9091b (English). Controller 9100 processes the instructions from the language learning software module, processes the instructions. Bus 9103 is used to operatively couple the modules. The language learning software 9036 can be stored locally at memory 9120 or remotely at a host 200 (not shown). Once the controller 9100 has executed the instructions to translate the foreign speech 9091a (Russian) into the user's native speech 9091b (English) the translated speech signal is sent to the text-to-speech module 9035b to be turned into the audible speech from the text. The output of the text-to-speech module is digital and is sent to digital to analog converter module 9021b which in turn converts the digital signal into analog signal to be sent to speaker 9006 in which it is presented in audible format to the user.

Figure 11:
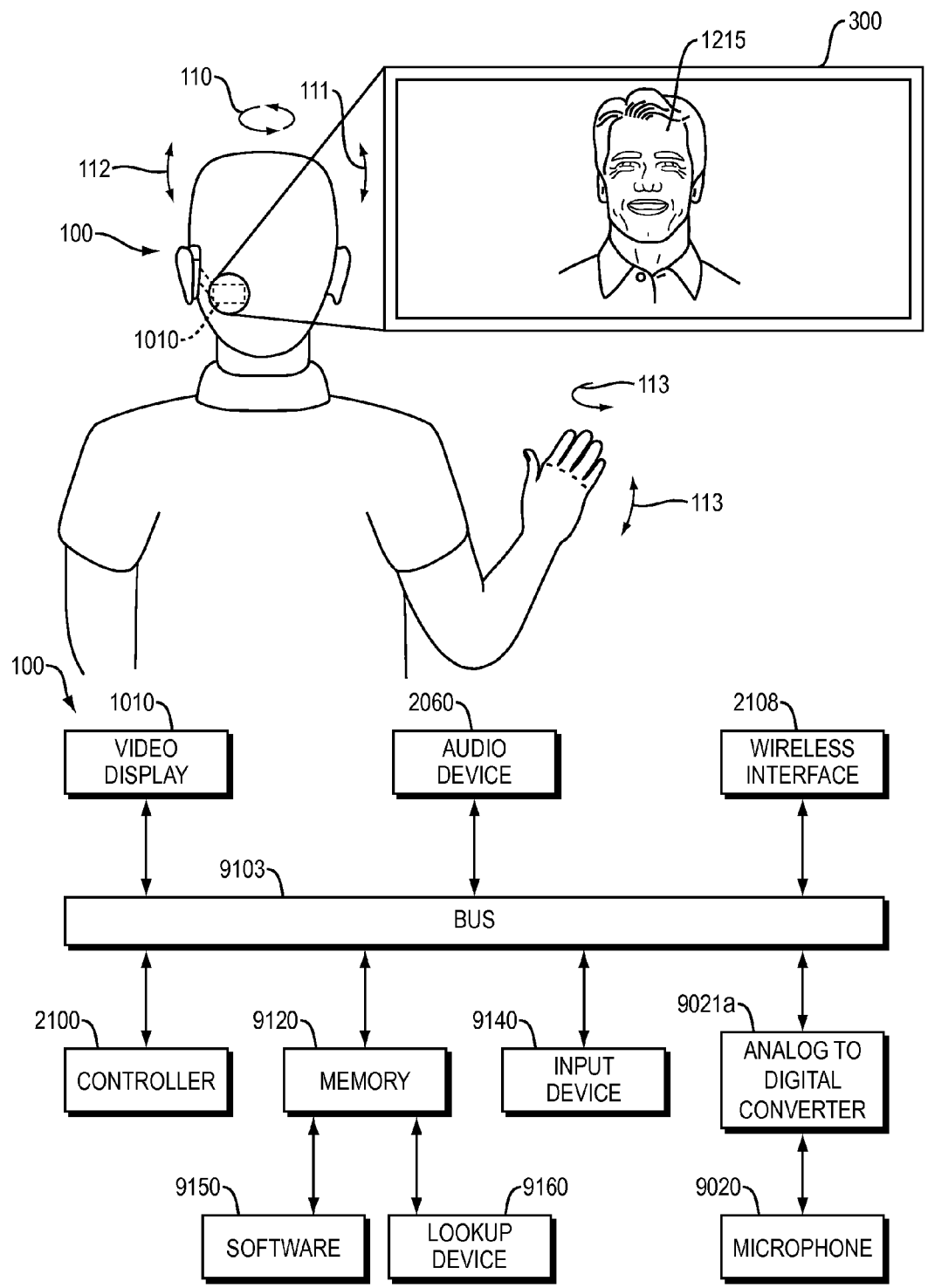
FIG. 11 is a schematic diagram illustrating the use of the hands-free computing headset to allow the user to interface with an expert avatar.

The hands-free computing headset 100 can also allow the user to interface with an avatar 1215 as illustrated in FIG. 11. The avatar software module 9150 can provide an expert consultant-like experience for the diagnosis and/or repair processes described above, and can be stored locally in memory module 9120 or remotely from the HMD 100. The avatar software can present a graphical image 300 of a human expert 1215 that interacts with the user in a manner similar to interacting with an actual human expert. The user's speech can be translated into inputs which are then processed by the avatar software 9150 and the expert diagnostic software 9150 responses are provided to the user through a combination of moving graphical images of a speaking expert 1215 and or video displays 300 and audio output.

Controller 2100 executes instructions the avatar software module and/or combined with expert diagnostic software module 9150. Bus 9103 operably connects the controller 2100 software module 9150 to memory 9120. User input is received through input device 9140 which may include head tracking and/or hand gesture tracking sensors, such as those recited above. Voice commands are received at microphone 9020 which are then converted using analog to digital converter 9021a and used as the input commands (or part of the input commands) to interact with the avatar software 9150. Video display 1010 displays the avatar 1215 via the displayed information field of view 300. Associated audio is presented to the user at audio device 2060 (speakers), the audio being associated with replies from the avatar 1215. Wireless interface 2108 allows the headset computer 100 to communicate with a host 200 (not shown) in order to access remote relocated software modules 9150.

Figure 12:
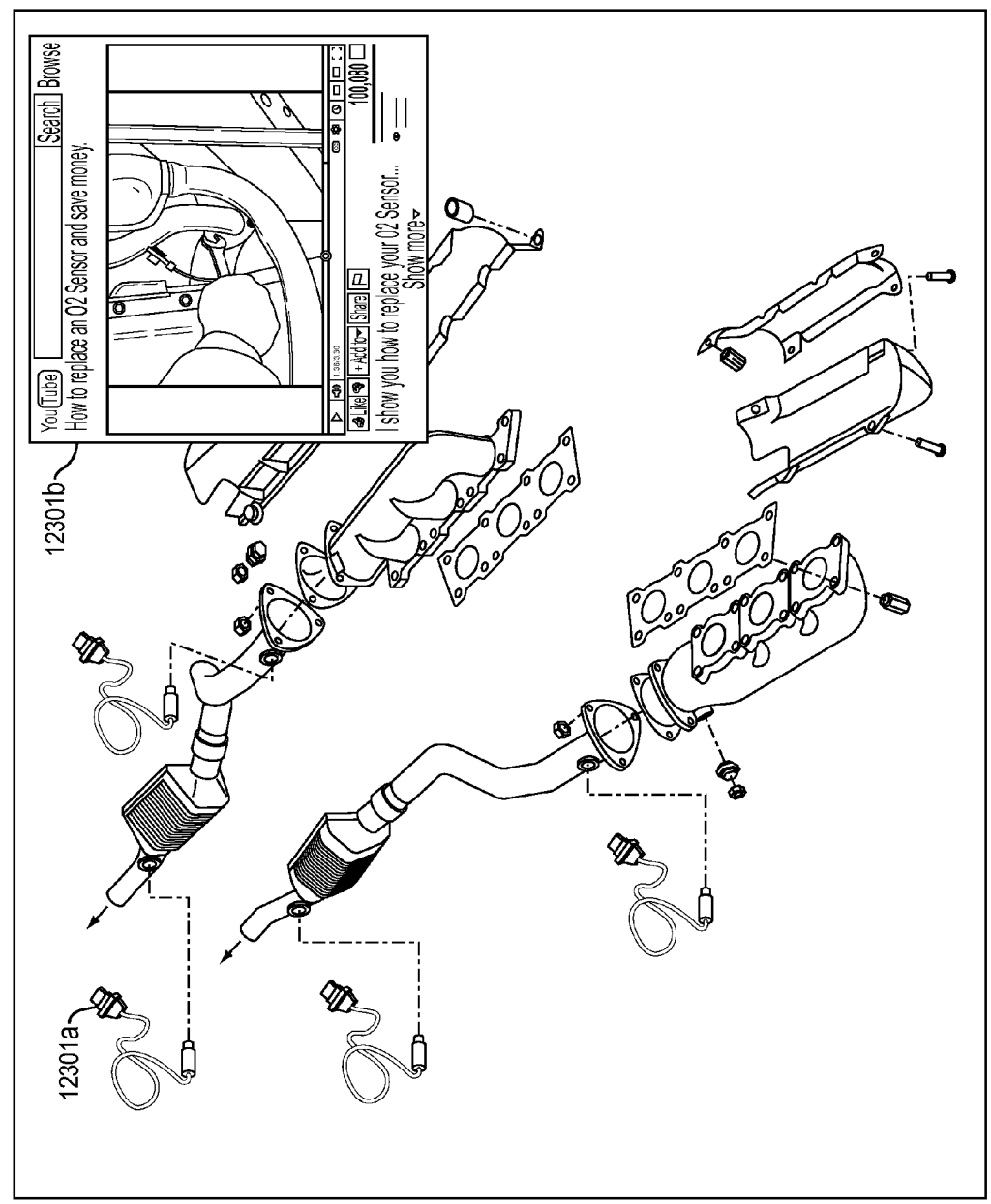
FIG. 12 illustrates an example embodiment microdisplay screen view presenting visual information to the user, including windows within windows.

FIG. 12 illustrates an example embodiment of how visual information 300 can be presented to the user on the microdisplay 1010, including windows 12301b within windows 12301a. Such a presentation can allow the user to view both graphical data and video data at the same time. For example, a user can see a repair video 12301b overlaid on top of a repair schematic 12301a, with the repair schematic being larger than the repair video 12301b so that the user could see the layout of the problem he or she is working on as well as the video instructions on how to perform repairs for, and manipulate, the device under repair. This is more than just a mere window in the background; window in window can expand the view that is in the background so that the user is able to view specific activated elements of the window, such as a tracing of a path along a schematic diagram or so that he or she can focus on separate parts. The user can perform these functions using verbal and/or hand 113 or head gesture commands 110, 111, 112. This enables the user to see one level of information at one level of display zoom, and to also see another, or several other, level of information in the background at another level of zoom. A windows 12301b within windows 12301a presentation 300 can allow the user to alter the display size of the video and/or graphical presentations to the exact size the user desires (the whole screen or less).

While this invention has been particularly shown and described with references to example embodiments thereof, it will be understood by those skilled in the art that various changes in form and details may be made therein without departing from the scope of the invention encompassed by the appended claims.

What is claimed is:

1. A portable wireless video computing headset device comprising:
   a frame;
   one or more high-resolution microdisplays, for displaying visual information received from a local processor, the one or more microdisplays supported by a cantilever arm integral with the frame locating the one or more microdisplays near an eye of a user of the headset device;
   one or more peripheral ports integral with the frame, for supporting one or more peripheral devices that provide input signals indicating a sensor input or at least one of a user motion and/or vocal input;
   the local processor, located in the portable wireless video computing headset device, and further comprising:
      one or more receivers, for receiving the peripheral inputs;
      a translator, for translating sensor information, user motion and/or vocal input into one or more user commands;
      a display controller, for forwarding information to be displayed on the one or more microdisplays;
      a communications interface, for wirelessly communicating with a remote host processor, the communications including expert diagnosis and/or repair information received from the host processor, said information including at least a portion of a diagnostic decision tree; and
      a software module, including instructions for the local processor to present the portion of the diagnostic decision tree, based upon the one or more user commands, on at least one of (i) the one or more microdisplays and (ii) an optional audio output device.

2. The apparatus of claim 1 wherein the expert diagnosis and/or repair information accessed is provided by a software program.

3. The apparatus of claim 1 wherein the expert diagnosis and/or repair information accessed is provided by a person (or persons).

4. A portable wireless video computing headset device comprising:
   a frame;
   one or more high-resolution microdisplays, for displaying visual information received from a local processor, the one or more microdisplays supported by a cantilever arm integral with the frame locating the one or more microdisplays near an eye of a user of the headset device;
   one or more peripheral ports integral with the frame, for supporting one or more peripheral devices that provide input signals indicating a sensor input or at least one of a user motion and/or vocal input;
   a local processor, located in the portable wireless video computing headset device and configured (a) to present at least a first and a second input prompt to the user at at least one of (i) the one or more microdisplays and (ii) an optional audio output device and (b) to receive via the one or more peripheral devices a first and a second user input responsive respectively to the first and the second input prompts, wherein the second input prompt is determined at least in part by the first user input, and further comprising:
      one or more receivers, for receiving the peripheral inputs;
      a translator, for translating sensor information, user motion and/or vocal input into one or more user commands;
      a display controller, for forwarding information to be displayed on the one or more microdisplays; and
      a software module, to enable expert diagnosis and/or repair information, said information including instructions for the local processor to present the first and the second input prompts.

5. A portable wireless video computing headset device comprising:
   a frame;
   one or more high-resolution microdisplays, for displaying visual information received from a local processor, the one or more microdisplays supported by a cantilever arm integral with the frame locating the one or more microdisplays near an eye of a user of the headset device;
   one or more peripheral ports integral with the frame, for supporting one or more peripheral devices that provide one or more peripheral input signals indicating a sensor input or at least one of a user motion and/or vocal input;
   one or more cameras, for capturing video, supported by the one or more peripheral ports, arranged such that the captured video approximates the field of view of a user;
   the local processor, located in the portable wireless video computing headset device, and further comprising:

one or more receivers, for receiving the peripheral inputs;

a translator, for translating sensor information, user motion and/or vocal input into one or more user commands;

a display controller, for forwarding information to be displayed on the one or more microdisplays;

a communications interface, for wirelessly communicating with a host processor, the communications providing to the host processor the captured video and at least first and second user inputs, and receiving from the host processor information determined by an expert, said information including at least first and second input prompts;

a software module, including instructions for the local processor to (a) to present the at least first and second input prompts received from the host processor to the user at at least one of (i) the one or more microdisplays and (ii) an optional audio output device and (b) to receive via the one or more peripheral devices first and a second user inputs responsive respectively to the first and the second input prompts, wherein the second input prompt is determined at least in part by the first user input.

6. The apparatus of claim 5 wherein the information determined by an expert is provided by a software program.

7. The apparatus of claim 5 wherein the one or more cameras include a visible light camera, an ultraviolet (UV) light camera, and an infrared (IR) camera.

8. The apparatus of claim 5 wherein the information determined by an expert is provided by a person (or persons).

9. A method of expert-assisted diagnosis and/or repair comprising:

given: a portable wireless computing headset device worn by a user and having a frame, one or more high-resolution microdisplays for displaying visual information received from a local processor, the one or more microdisplays supported by a cantilever arm integral with the frame locating the one or more microdisplays near an eye of the user of the headset device; one or more peripheral devices integral with the frame, for providing one or more peripheral input signals indicating a sensor input or at least one of a user motion and/or vocal input at one or more peripheral port; and a local processor, located in the portable wireless video computing headset device, and further comprising:

one or more receivers, for receiving the peripheral inputs;

a translator, for translating sensor information, user motion and/or vocal input, into one or more user commands; and a display controller, for forwarding information to be displayed on the one or more microdisplays;

the device presenting to the user at least a portion of a diagnostic decision tree on at least one of (i) the one or more microdisplays and (ii) an optional audio output device, the at least a portion of the diagnostic decision tree generated by the processing software;

the device receiving from the user via the one or more peripheral devices an input responsive to the presented portion of the diagnostic decision tree; and the user rendering a diagnosis and/or executing a repair based at least in part on the presented portion of the diagnostic decision tree;

wherein the diagnostic decision tree is provided by an expert.

10. A method of expert-assisted diagnosis and/or repair comprising:

given: a portable wireless computing headset device worn by a user and having a frame; one or more high-resolution microdisplays for displaying visual information received from a local processor, the one or more microdisplays supported by a cantilever arm integral with the frame locating the one or more microdisplays near an eye of the user of the headset device; one or more peripheral devices integral with the frame, for providing one or more peripheral input signals indicating a sensor input or at least one of a user motion and/or vocal input at one or more peripheral port; and a local processor, located in the portable wireless video computing headset device, and further comprising:

one or more receivers, for receiving the peripheral inputs;

a translator, for translating sensor information, user motion and/or vocal input, into one or more user commands; and a display controller, for forwarding information to be displayed on the one or more microdisplays:

the device presenting to the user at least a first and a second input prompt at at least one of (i) the one or more microdisplays and (ii) an optional audio output device;

the device receiving from the user via the one or more peripheral devices a first and a second user input responsive respectively to the first and the second input prompts, wherein the second input prompt is determined at least in part by the first user input;

the device presenting to the user diagnosis and/or repair-related information on at least one of (i) the one or more microdisplays and (ii) the optional audio output device; and the user rendering a diagnosis and/or executing a repair based at least in part on the diagnosis and/or repair-related information;

wherein the first and second input prompts and the user diagnosis and/or repair-related information are provided by an expert.

11. The method of claim 9 wherein the computing headset device further comprises a communications interface, for wirelessly communicating with a remote host processor, and further comprising the step of the headset device receiving from the host processor a representation of the at least a portion of a diagnostic decision tree.

12. The method of claim 9 wherein the local processor of the portable wireless computing headset device further comprises software executing on the local processor and further comprising the step of the software generating the portion of a diagnostic decision tree for presentation.

13. The method of claim 10 wherein the computing headset device further comprises a communications interface, for wirelessly communicating with a remote host processor, and further comprising the step of the headset device receiving from the host processor the user diagnosis and/or repair-related information provided by an expert.

14. The method of claim 10 wherein the local processor of the portable wireless computing headset device further comprises software executing on the local processor and further comprising the step of the software generating the user diagnosis and/or repair-related information provided by an expert.

* * * * *